(12) United States Patent
Walker et al.

(10) Patent No.: US 11,966,739 B2
(45) Date of Patent: Apr. 23, 2024

(54) PROCESSING OF ISSUED INSTRUCTIONS

(71) Applicant: Arm Limited, Cambridge (GB)

(72) Inventors: Matthew James Walker, Cambridge (GB); Mbou Eyole, Soham (GB); Giacomo Gabrielli, Cambridge (GB); Balaji Venu, Cambridge (GB)

(73) Assignee: Arm Limited, Cambridge (GB)

( * ) Notice: Subject to any disclaimer, the term of this patent is extended or adjusted under 35 U.S.C. 154(b) by 49 days.

(21) Appl. No.: 17/941,387

(22) Filed: Sep. 9, 2022

(65) Prior Publication Data

US 2024/0086196 A1 Mar. 14, 2024

(51) Int. Cl.
*G06F 9/30* (2018.01)
*G06F 9/38* (2018.01)
*G06F 9/48* (2006.01)

(52) U.S. Cl.
CPC ...... *G06F 9/30123* (2013.01); *G06F 9/30138* (2013.01); *G06F 9/3824* (2013.01); *G06F 9/4881* (2013.01); *G06F 9/30098* (2013.01); *G06F 9/30145* (2013.01)

(58) Field of Classification Search
CPC ............. G06F 9/30123; G06F 9/30138; G06F 9/3824; G06F 9/4881; G06F 9/30098; G06F 9/30145
See application file for complete search history.

(56) References Cited

U.S. PATENT DOCUMENTS

| 7,814,242 | B1 | 10/2010 | Wentzlaff | |
| 2003/0041216 | A1 | 2/2003 | Rosenbluth | |
| 2017/0192921 | A1 | 7/2017 | Wang | |
| 2020/0319923 | A1* | 10/2020 | Ro | G06F 3/0608 |
| 2021/0216318 | A1* | 7/2021 | Langhammer | G06F 9/30032 |
| 2021/0286755 | A1* | 9/2021 | Vorbach | G06F 9/345 |
| 2022/0121448 | A1* | 4/2022 | Baronne | G06F 9/3001 |

(Continued)

OTHER PUBLICATIONS

Parashar et al., "Efficient Spatial Processing Element Control Via Triggered Instructions", Published by the IEEE Computer Society, May/Jun. 2014, pp. 120-137.

(Continued)

*Primary Examiner* — Corey S Faherty
(74) *Attorney, Agent, or Firm* — NIXON & VANDERHYE P.C.

(57) ABSTRACT

There is provided an apparatus, method and medium for data processing. The apparatus comprises a register file comprising a plurality of data registers, and frontend circuitry responsive to an issued instruction, to control processing circuitry to perform a processing operation to process an input data item to generate an output data item. The processing circuitry is responsive to a first encoding of the issued instruction specifying a data register, to read the input data item from the data register, and/or write the output data item to the data register. The processing circuitry is responsive to a second encoding of the issued instruction specifying a buffer-region of the register file for storing a queue of data items, to perform the processing operation and to perform a dequeue operation to dequeue the input data item from the queue, and/or perform an enqueue operation to enqueue the output data item to the queue.

20 Claims, 14 Drawing Sheets

(56) References Cited

U.S. PATENT DOCUMENTS

2022/0342633 A1   10/2022   Shveidel
2023/0195469 A1    6/2023   Bandishte

OTHER PUBLICATIONS

Repetti et al., "Pipelining a Triggered Processing Element", Association for Computing Machinery MICRO-50, Oct. 14-18, 2017, pp. 96-108.
U.S. Appl. No. 17/941,404, filed Sep. 9, 2022, Walker et al.
Office Action dated Nov. 17, 2023 for U.S. Appl. No. 17/941,404, 11 pages.

* cited by examiner

First/second encoding specified in operand/destination field

| Trigger condition information | Opcode | Register(s) | Destination (register(s)) | Trigger action information |

70

| Trigger condition information | Opcode | Register(s) and/or buffer dequeue register(s) | Destination (register(s) or buffer enqueue register(s)) | Trigger action information |

First/second encoding specified by opcode

| Trigger condition information | First opcode | Operand(s) | Destination(s) | Trigger action information |

74

| Trigger condition information | Second opcode | Operand(s) | Destination(s) | Trigger action information |

PROCESSING OF ISSUED INSTRUCTIONS

TECHNICAL FIELD

The present invention relates to the field of data processing.

BACKGROUND

A data processing apparatus may have a register file for storing operands that are to be used for processing by processing circuitry that is provided as part of the apparatus, and/or that are generated as a result of processing. The register file may comprise a plurality of data registers that are referenced by instructions that are issued for processing.

SUMMARY

In some configurations described herein there is an apparatus comprising:
a register file comprising a plurality of data registers; and
frontend circuitry responsive to an issued instruction, to control processing circuitry to perform a processing operation to process an input data item to generate an output data item,
wherein:
the processing circuitry is responsive to a first encoding of the issued instruction specifying a data register of the plurality of data registers, to at least one of:
read the input data item for the processing operation from the data register; and
write the output data item generated in the processing operation to the data register; and
the processing circuitry is responsive to a second encoding of the issued instruction specifying a buffer-region of the register file for storing a queue of data items, to perform the processing operation and at least one of:
perform a dequeue operation to dequeue the input data item for the processing operation from the queue; and
perform an enqueue operation to enqueue the output data item generated in the processing operation to the queue.

In some configurations described herein there is a method of operating an apparatus comprising a register file comprising a plurality of data registers, the method comprising:
controlling, in response to an issued instruction, processing circuitry to perform a processing operation to process an input data item to generate an output data item,
wherein
in response to a first encoding of the issued instruction specifying a data register of the plurality of data registers, the controlling comprises at least one of:
reading the input data item for the processing operation from the data register; and
writing the output data item generated in the processing operation to the data register; and
in response to a second encoding of the issued instruction specifying a buffer-region of the register file for storing a queue of data items, the controlling comprises controlling the processing circuitry to perform the processing operation and at least one of:
performing a dequeue operation to dequeue the input data item for the processing operation from the queue; and
performing an enqueue operation to enqueue the output data item generated in the processing operation to the queue In some configurations described herein there is a non-transitory computer-readable medium to store computer-readable code for fabrication of an apparatus comprising:
a register file comprising a plurality of data registers; and
frontend circuitry responsive to an issued instruction, to control processing circuitry to perform a processing operation to process an input data item to generate an output data item,
wherein:
the processing circuitry is responsive to a first encoding of the issued instruction specifying a data register of the plurality of data registers, to at least one of
read the input data item for the processing operation from the data register; and
write the output data item generated in the processing operation to the data register; and
the processing circuitry is responsive to a second encoding of the issued instruction specifying a buffer-region of the register file for storing a queue of data items, to perform the processing operation and at least one of:
perform a dequeue operation to dequeue the input data item for the processing operation from the queue; and
perform an enqueue operation to enqueue the output data item generated in the processing operation to the queue.

BRIEF DESCRIPTION OF THE DRAWINGS

The present invention will be described further, by way of example only, with reference to configurations thereof as illustrated in the accompanying drawings, in which:

FIG. 4a illustrates an example of a first encoding and a second encoding for an issued instruction;

FIG. 4b illustrates an example of a first encoding and a second encoding for an issued instruction;

DESCRIPTION OF EXAMPLE CONFIGURATIONS

Figure 1:
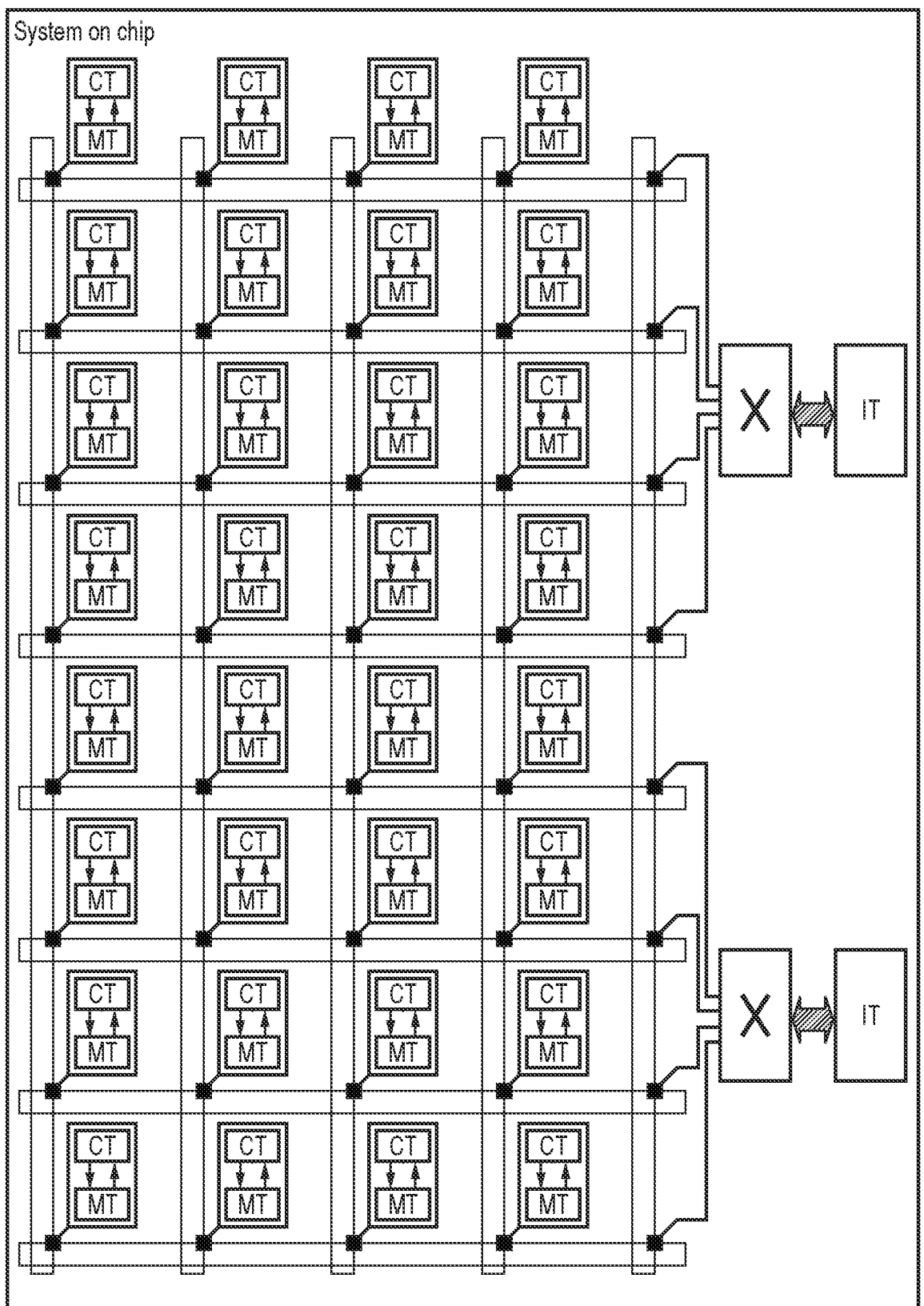
FIG. 1 illustrates an apparatus comprising a number of triggered-instruction processing elements coupled by an on-chip communication interconnect.

Before discussing the configurations with reference to the accompanying figures, the following description of configurations is provided.

In a processing apparatus, processing circuitry can be provided which processes instructions. Such apparatuses use instruction encodings that specify the instruction to be performed and, optionally, one or more registers from which operands for that instruction are to be read and to which a result of the operation is to be written.

In some use cases, e.g., machine learning, computer vision, communications, and signal processing applications, the processing apparatus may be required to perform a same processing operation on a sequence of data items that are stored, for example, in a buffer structure. One approach to using such buffer structures for an input data item involves dequeuing the input data item from a buffer into a register using a first instruction, performing a processing operation using the dequeued data item and outputting a result of the processing operation to a result register. Alternatively, or in addition, when the output data item is to be stored in a buffer structure, the outputting typically involves the use of an extra instruction to enqueue the output data item from the result register to the buffer structure.

In some configurations there is provided an apparatus comprising a register file comprising a plurality of data registers, and frontend circuitry responsive to an issued instruction, to control processing circuitry to perform a processing operation to process an input data item to generate an output data item. The processing circuitry is responsive to a first encoding of the issued instruction specifying a data register of the plurality of data registers, to at least one of: read the input data item for the processing operation from the data register; and write the output data item generated in the processing operation to the data register. The processing circuitry is responsive to a second encoding of the issued instruction specifying a buffer-region of the register file for storing a queue of data items, to perform the processing operation and at least one of: perform a dequeue operation to dequeue the input data item for the processing operation from the queue; and perform an enqueue operation to enqueue the output data item generated in the processing operation to the queue.

The issued instruction may be an instruction of an instruction set architecture (ISA). An instruction set architecture is a complete set of instructions that can be used by a compiler or a programmer in order to control processing circuitry. Instructions of the ISA are interpreted by the frontend circuitry, which may comprise decoder circuitry to decode the issued instruction in order to generate control signals that are used to control the processing circuitry to perform a task specified in the instruction.

The apparatus is responsive to at least two encodings of the issued instruction specifying a same processing operation. The first encoding corresponds to the approach in which registers are specified for the input data item and/or the output data item. On the other hand, the second encoding specifies that the input/output data item is dequeued from and/or enqueued to a buffer structure that is implemented within the register file. For example, for the input or output data item of the instruction, the encoding may specify a buffer region of the register file instead of specifying a particular register. In the second encoding, and when the instruction specifies that a buffer region is to be used for an input data item of the processing operation, the input data item is dequeued from the buffer. The term dequeue is used to indicate the reading of a first input data item from a queue of data items within the buffer-region such that a subsequent dequeue will result in the reading of a second input data item from the queue that is stored at next queue location that is different to the location of the first input data item. In the second encoding, and when the instruction specifies that a buffer-region is to be used for an output data item that is generated by the processing operation, the output data item is enqueued to the buffer-region. The term enqueue is used to indicate the writing of a first output data item to a queue of data items within the buffer-region is such that a subsequent enqueue, referencing the same buffer-region, will result in the writing of a second output data item to be stored in the queue at a sequentially next location that is different to the location of the first output data item. The buffer-region is implemented in the register file and, as a result enables the reuse of the existing register interface reducing hardware complexity. Furthermore, the use of a second encoding that directly accesses the buffer-region (as well as performing the processing operation itself) increases program performance since dedicated buffer manipulation instructions are not necessary for common buffer tasks. For example, a computation instruction can directly access the buffer (rather than using a separate access instruction to dequeue/enqueue the buffer separate from the instruction that does the computation to process the dequeued value and/or generate the enqueued value).

The apparatus may use a program-counter based architecture, in which a program counter indicates a point of program flow reached in the execution of a program, and the correct program flow order is based on sequential processing of instructions in the order in which they are stored in memory, apart from at branch instructions which trigger a non-sequential jump from an instruction at one address to an instruction at another address. At each branch point, there are typically only two options for the instruction to execute next—either the next sequential instruction after the branch (if the branch is not taken), or the instruction at the target address of the branch (if the branch is taken).

Alternatively, in some configurations the frontend circuitry is arranged to store a plurality of instructions and is configured to perform a comparison operation to compare an execution state of the processing circuitry to a plurality of trigger conditions each associated with an instruction of the plurality of instructions, and the frontend circuitry is responsive to the comparison indicating a match between one of the plurality of trigger conditions and the execution state to issue the instruction associated with that trigger condition as the issued instruction. Such an approach is known as a triggered instruction architecture, where a pool of triggered instructions is defined with no predefined order in which the triggered instructions are to be executed. Each triggered instruction specifies one or more trigger conditions which define events or conditions that are required to be satisfied by an execution state of the machine (machine state) to allow the triggered instruction to be issued for execution. The triggered instruction can also specify one or more trigger actions for updating the execution state used to evaluate trigger conditions for the triggered instructions. In each cycle of selecting an instruction to be issued next, a processing element operating according to the triggered instruction architecture can review whether the trigger conditions for multiple (two or more) triggered instructions are satisfied and issue an instruction for which the corresponding trigger conditions are met. At each decision point, there can be more than two options for which instructions is executed next, with the selection between those options depending on whether the trigger conditions for each of the options are satisfied. As a triggered instruction itself specifies the conditions necessary for its execution to commence and can also perform a computation, control flow managing instructions such as branch instructions can be eliminated, allowing more of the available instruction processing bandwidth to be used for computation, improving processing performance.

The above technique (of using a second encoding of an issued instruction to control processing circuitry to both perform a processing operation and at least one of dequeue/enqueue an item on the buffer mapped to the register file) can be particularly useful for an apparatus supporting a triggered instruction architecture, because a constraint with such triggered instruction architectures is that there may be a practical limit on the number of instructions that have their triggered conditions monitored, when selecting the next triggered instruction to be issued. If dedicated instructions are needed to perform the dequeue/enqueue operation separate from an instruction performing the processing operation, this reduces the number of instruction slots in the pool of instructions having their conditions monitored which are available for performing computation. Hence, supporting the second encoding described above helps eliminate such dedicated buffer dequeue/enqueue operation instructions, freeing up instruction slots for other instructions which can do computation. By increasing the compute density of the pool of instructions, performance can be improved.

In some examples, the issued instruction may be issued in response to the execution state of the processing circuitry meeting the trigger condition associated with the issued instruction. The issued instruction could be set up so as to retain a current execution state on completion such that the issued instruction is repeatedly executed. When the issued instruction uses the second encoding, the issued instruction would sequentially work through a queue of data items (dequeued as input data item and/or enqueued based on output data items) in the buffer region. Such a sequence would iterate until the execution state of the processing circuitry meets a predefined condition. At this point the execution state is changed and a different instruction may be issued. Such an approach provides a compact loop in which a single instruction is looped over until the predefined condition is met. However, the looping is achieved using a single instruction and by utilising the existing hardware features of the triggered architecture and the buffer-region implemented in the register file. Hence, there is no requirement for the triggered architecture to implement specific independent comparison instructions and branch instructions in order to achieve this behaviour.

As discussed, the execution state of the processing circuitry may be updated in response to the execution of an instruction. This is not the only mechanism by which the execution state of the processing circuitry can be updated. In some configurations the control circuitry is configured to update the execution state based on a current state of at least one buffer meeting a predetermined condition. This mechanism provides a compact approach for controlling the execution of the issued instructions. As the buffer's state can be used to influence the execution state which is checked by the frontend circuitry to determine whether to issue instructions, instructions can be triggered for issue based on particular buffer states without needing an explicit instruction to be executed to probe what state the buffer is in and make a decision on subsequent control flow, as would be the case in a program-counter based architecture. Again, this helps to increase the compute density in the pool of instructions available for checking of trigger conditions, improving performance.

In some configurations the predetermined condition is at least one of a buffer full condition and a buffer empty condition. The apparatus may be arranged to monitor a state of the buffer-region each time a data item is enqueued (either as a result of the issued instruction or otherwise) and each time that a data item is dequeued (either as a result of the instruction or otherwise), and to update the execution state based on an indication as to whether the enqueue/dequeue operation resulted in a state of the buffer changing to/from being full/empty. It can be useful to represent buffer full/empty status in the execution state checked against the trigger conditions of instructions, as these are useful trigger events for instructions.

The trigger conditions that are associated with the plurality of instructions may be encoded into the instructions. The trigger conditions can therefore be encoded to take into account any aspect of the execution state. In some configurations for at least one encoding of the trigger condition, the trigger condition is dependent on a current state of the at least one buffer. This ensures that the programmer or compiler has the option to encode a trigger condition that is dependent on the state of the at least one buffer. This approach provides a flexible way to provide control over the buffer that could, in a program counter based architecture, be provided using branches representing loops and if statements, but which in a triggered instruction architecture can instead be triggered based on the buffer state meeting a certain condition, without the requirement for specific conditional instructions and branching instructions separate from the instructions carrying out a computational processing operation.

Whilst the buffer region can be provided as a single buffer-region, in some configurations the buffer-region is one of a plurality of buffer-regions each for storing a corresponding queue of data items; the frontend circuitry is responsive to a further encoding of the issued instruction to control the processing circuitry to process the input data item and a further input data item to generate the output data item; and the processing circuitry is responsive to the further encoding of the issued instruction to perform a further dequeue operation to dequeue the further input data item from the corresponding queue of a second buffer-region of the plurality of buffer-regions. Hence, the apparatus can be provided with the flexibility to encode instructions which have plural input operands such that each operand of the plural input operands is associated with one of the plurality of buffer regions and (optionally) a result of an instruction with multiple inputs can be output to a buffer region.

Whilst each of the input data item and the further input data item can be obtained from a different buffer regions of the plurality of buffer-regions, in some configurations the buffer-region and the second buffer-region are a same buffer region; and the dequeue operation and the further dequeue operation comprise dequeuing the input data item and the further input data item from the queue. In some configurations the input data item and the further input data item are dequeued from a same location in the queue. In other words, the dequeued data item from the queue is provided as both the input data item and the further input data item. In some alternative configurations, an ordering is applied such that one of the input data item and the further input data item is dequeued prior to the other. In other words, the input data item and the further input data item are dequeued from sequential positions within the queue. In some configurations the ordering is hardwired into the frontend circuitry such that a sequentially first encoded operand is dequeued first and a sequentially second encoded operand is dequeued second. In alternative configurations, the sequentially second encoded operand could be dequeued first and the sequentially first encoded operand could be dequeued second. Alternatively, the ordering could be encoded as a separate parameter in the issued instruction providing flexibility to the programmer.

The particular form of the encoding can take various forms. In some configurations the second encoding of the issued instruction comprises an opcode and a register specifier field specifying one of a set of one or more buffer enqueue/dequeue registers; and the first encoding of the issued instruction comprises the opcode and the register specifier field specifying the data register. Hence, the register specifier field is used to distinguish the first/second encodings. This is useful because it avoids needing to expend an additional opcode on the second encoding of the instruction separate from the opcode used for the first encoding (opcode space can be limited in instruction set architectures). In the second encoding the encoding of the register specifier field references a particular register which is interpreted, by the processing circuitry, as instructing a dequeue/enqueue to the buffer-region. A different encoding of the register specifier field, referencing one of the regular registers, indicates that the instruction behaves as the first encoding. Hence, an existing form of non-buffer-accessing instruction can be repurposed as the second encoding (buffer-accessing) instruction simply by specifying a different register specifier in the register specifier field. This also has the advantage that there is no need to expend different opcodes on encoding whether the instruction is a dequeuing variant of the instruction (which reads an input data item by dequeuing from a buffer structure) or enqueuing variant of the instruction (which writes its output data item by enqueuing to a buffer structure), since the respective source/register specifier fields can simply be set to register specifiers corresponding to one of the buffer enqueue/dequeue registers if the instruction is to act as one of the dequeuing/enqueuing variants.

For example, the register file may be provided with a particular control register that is used to indicate that the buffer-region is intended. There may be multiple such control registers corresponding to different buffer structures, if more than one buffer structure is supported mapped to the register file. Optionally, the particular control register may comprise information indicating where the buffer-region is located in the register file and the processing circuitry is responsive to the second encoding specifying the particular control register to access the buffer-region using the control information that is located in the register file, or such information may be stored in associated registers other than the particular control register. Alternatively, the location of the buffer region in the register file could be hardwired into the control logic which detects a read/write to the control register and responds with a read/write to the corresponding register representing the location of the buffer—in that case no stored information would be needed to decide which registers represent the buffer structure as a whole (although stored information identifying head/tail pointers as discussed below may still be provided). Either way, one advantage of using a register specifier field to identify the buffer enqueue/dequeue registers is that the same opcodes can be used for each of the first encoding and the second encoding.

In some configurations, the first encoding of the issued instruction and the second encoding of the issued instruction correspond to different opcodes. For example, a set of instructions could be provided with at least one of the set of instructions having at least two possible opcodes. In such a configuration, the processing circuitry is responsive to one of the at least two possible opcodes to recognise that the encoding is the first encoding and that the operands are referring to data registers in the register file that are to be read from and/or written to. The processing circuitry is also responsive to another of the at least two possible opcodes to recognise that the encoding is the second encoding and that the operands are referring to buffer-regions stored in the register file that are to be used for enqueue/dequeue operations. There could be separate opcodes corresponding to dequeuing/enqueuing variants of the second encoding.

The buffer-region can be managed in various ways. In some configurations, the apparatus comprises configuration storage to store configuration data comprising a head pointer identifying an enqueue location in the register file from which to perform the enqueue operation and a tail pointer identifying a dequeue location in the register file from which to perform the dequeue operation. The head/tail pointers can be used to determine which particular register in the register file is written for an enqueue operation and read for a dequeue operation. Hence, exactly the same instruction (with an identical encoding specifying a particular buffer to be dequeued or enqueued) can reference different registers for its dequeue/enqueue operation depending on the current values of the tail pointer (for dequeue) or head pointer (for enqueue) at the time the instruction is executed.

The head pointer and the tail pointer can be interpreted by the processing circuitry in different ways. In some configurations the enqueue operation comprises writing the output data item to the enqueue location and updating the head pointer to indicate a next enqueue location in the register file and the dequeue operation comprises reading the input data item from the dequeue location and updating the tail pointer to indicate a next dequeue location in the register file. The head pointer can indicate the next enqueue location by pointing to a most recently enqueued data item such that enqueuing comprises first updating the head pointer to indicate the next enqueue location and then, subsequently, writing the output data item. Alternatively, the head pointer can indicate the next enqueue location by pointing to the next location to which data is to be written such that enqueuing comprises first writing the output data item to the enqueue location and then, subsequently, updating the head pointer to point to the next enqueue location. Similarly, the tail pointer can indicate the next dequeue location by pointing to the location of the last dequeued data item such that dequeuing comprises first updating the tail pointer to point to the next dequeue location and then, subsequently, reading the data item. Alternatively, the tail pointer can indicate the next dequeue location by pointing to the location of the data item to be dequeued next such that dequeuing comprises first reading the data item and then, subsequently, updating the tail pointer to point to the next dequeue location. The buffer can be arranged such that data items are stored in order of increasing address, such that updating the head/tail pointer comprises incrementing the address to which the head/tail pointer points by an amount equal to the size of a data item, or in order of decreasing address, such that updating the head/tail pointer comprises decrementing the address to which the head/tail pointer points by an amount equal to the size of a data item. The dequeue operation may be a non-destructive operation such that the data item is read but is not overwritten/deleted.

In some configurations the processing circuitry is responsive to a third encoding of the issued instruction specifying the buffer-region of the register file to perform a no-dequeue read operation comprising reading the input data item from the dequeue location and retaining a current value of the tail pointer. The no-dequeue read provides a mechanism for a data value that is stored at a location indicated by the tail pointer to be referenced at subsequent times by plural instructions without the tail pointer being advanced.

In some configurations the processing circuitry is responsive to a fourth encoding of the issued instruction specifying the buffer-region of the register file to perform a no-enqueue write operation comprising writing the output data item to the enqueue location and retaining a current value of the head pointer. The no-enqueue write operation effectively overwrites a current data item that is stored at the location indicated by the head pointer, without the head pointer being advanced.

In some configurations the configuration data comprises information identifying the buffer-region. The information identifying the buffer-region may be a buffer start pointer indicating a starting location in the buffer file and a buffer end pointer indicating an ending location in the buffer file. Alternatively, the information identifying the buffer-region may be any information from which the starting location and the ending location can be derived. For example, one of a starting location and an ending location could be provided in combination with a buffer size.

In some configurations the configuration storage is comprised in the register file. The configuration storage may be fully accessible to the programmer/compiler and may be used to define plural buffer-regions. This provides flexibility to the programmer/compiler and enables overlapping buffers to be defined with the management of the overlapping buffers to be maintained by the programmer/compiler.

For configurations in which the configuration information is stored in programmer accessible data registers, the configuration information can be maintained using regular register read/write information. Alternatively, in some configurations the frontend circuitry is responsive to an update configuration instruction identifying new configuration data, to update the configuration data to the new configuration data. The instruction may be an instruction of the instruction set architecture that is interpreted by decoder circuitry that is comprised in the frontend circuitry. For example, the update configuration instruction could be a system register updating instruction. The update configuration instruction may specify a complete set of configuration information and/or may be used to update identified portions of the configuration data, for example, to modify a size of a buffer-region.

In some configurations the frontend circuitry is responsive to a buffer access instruction specifying an element of the buffer, to cause the processing circuitry to access a specified data item stored in the element of the buffer. The buffer access instruction may be an instruction of the instruction set architecture that is interpreted by decoder circuitry that is comprised in the frontend circuitry. The buffer access instruction provides the means to access a specific data item, for example, identified by a buffer-region identifier and a location of the data item within the buffer region identified by the buffer region identifier (e.g. by specifying an offset relative to the start or end of the buffer region). The buffer access instruction may be a buffer read instruction to read the specific data item or a buffer write instruction to write data to the specific data item location.

In some configurations the buffer-region may be provided in a dedicated region of the register file, that cannot be addressed by the first encoding as one of the plurality of data registers.

In alternative configurations, the buffer-region of the register file overlaps the plurality of data registers, so that any given location in the buffer can also be referenced as a register read/write by specifying the register identifier of the corresponding data register in an instruction having the first encoding. The overlap and use of the buffer-regions and the data registers can be managed by the programmer/compiler resulting in a flexible interface.

In some configurations the buffer-region is a circular buffer region. The circular buffer can be maintained through the use of the head and tail pointers as discussed above. In such configurations, the processing circuitry may be configured to update the head/tail pointers such that when the head/tail pointer exceeds a predetermined limit at one end of the buffer-region (i.e., the buffer overflows), the head/tail pointer is reset to the other end of the buffer region.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates a data processing apparatus 10 arranged as a spatial architecture according to various examples of the present techniques. Spatial architectures can accelerate some applications by unrolling or unfolding the computations, which form the most time-consuming portion of program execution, in space rather than in time. Computations are unrolled in space by using a plurality of hardware units capable of concurrent operation. In addition to taking advantage of the concurrency opportunities offered by disaggregated applications which have been spread out on a chip, spatial architectures, such as data processing apparatus 10, also take advantage of distributed on-chip memories. In this way, each processing element is associated with one or more memory blocks in close proximity to it. As a result, spatial architectures can circumvent the von-Neumann bottleneck which hinders performance of many traditional architectures.

The data processing apparatus 10 comprises an array of processing elements (compute/memory access clusters) connected via an on-chip communication interconnect, such as a network on chip. The network is connected to a cache hierarchy or main memory via interface nodes, which are otherwise referred to as interface tiles (ITs) and are connected to the network via multiplexers (X). Each processing element comprises one or more compute tiles (CTs) and a memory tile (MT). While FIG. 1 shows a 1:1 mapping between CTs and MTs, other examples could share a MT between more than one CT. The CTs perform the bulk of the data processing operations and arithmetic computations performed by a given processing element (PE). The MTs act as memory access control circuitry and have the role of performing data accesses to locally connected memory (local storage circuitry) and data transfers to/from the more remote regions of memory and inter-processing element memory transfers between the processing element and other processing elements.

In some example configurations each of the PEs comprises local storage circuitry connected to each memory control circuit (MT) and each memory control circuitry (MT) has direct connections to one processing circuit (CT). Each PE is connected to a network-on-chip which is used to transfer data between memory control circuits (MTs) and between each memory control circuit (MT) and the interface node (IT).

In alternative configurations local storage circuitry is provided between plural processing elements and is accessible by multiple memory control circuits (MTs). Alternatively, a single MT can be shared between plural CTs.

The processing circuitry formed by the respective compute/memory access clusters (CTs/MTs) shown in FIG. 1 may, for example, be used as a hardware accelerator used to accelerate certain processing tasks, such as machine learning processing (e.g. neural network processing), encryption, etc. The ITs may be used to communicate with other portions of a system on chip (not shown in FIG. 1), such as memory storage and other types of processing unit (e.g. central processing unit (CPU) or graphics processing unit (GPU). Configuration of control data used to control the operation of the CTs/MTs may be performed by software executing on a CPU or other processing unit of the system.

The CTs (or the cluster of CTs and MTs as a whole) can be seen as triggered-instruction processing elements, which execute instructions according to a triggered instruction architecture, rather than a program-counter-based architecture.

In a conventional program-counter-based architecture, a program counter is used to track sequential stepping of program flow through a program according to a predefined order defined by the programmer or compiler (other than at branch points marked by branch instructions). The correct sequence through the program is sequential other than that the branch points. At a branch point there are only two options for the next step in the program flow (taken or not-taken). Although a processor implementation may use techniques such as out of order processing and speculation to execute instructions in a different order from the program order, the results generated must be consistent with the results that would have been generated if the instructions were executed in program order.

In contrast, for a triggered instruction architecture, a number of triggered instructions are defined by the programmer or compiler which have no predefined order in which they are supposed to be executed. Instead, each triggered instruction specifies the trigger conditions to be satisfied by the machine state of the processing element for that instruction to validly be issued for execution. In a given cycle of determining the next instruction to issue, a triggered-instruction processing element can monitor multiple triggered instructions in the same cycle to check whether their trigger conditions are satisfied (rather than examining, at most, the conditions for taking or not-taking a single branch instruction in order to determine the next instruction to be executed after the branch, as in a program-counter based architecture).

It is possible for a triggered-instruction processing element to use speculation to predict which instructions will satisfy their respective trigger conditions, so that instructions can be issued before the trigger conditions are actually satisfied. This helps allow a processing pipeline to be more fully utilised (compared to the case in the absence of speculation, when the processing element waits for a given instruction to update the machine state before evaluating whether the machine state satisfies trigger conditions for another instruction). Such speculation can help to improve performance. However, even if speculation is used so that instructions are issued for execution before their trigger conditions are actually satisfied, the end result should be consistent with the result that would have been achieved if the update to machine state by one instruction was made before evaluating the trigger conditions for selecting the next instruction to be issued for execution. Hence, if the speculation was incorrect and an instruction was issued for execution but it is determined later that the trigger conditions for that instruction were not satisfied, then a recovery operation may be performed to flush results which could be incorrect and resume execution from a correct point prior to the mis-speculation.

Figure 2:
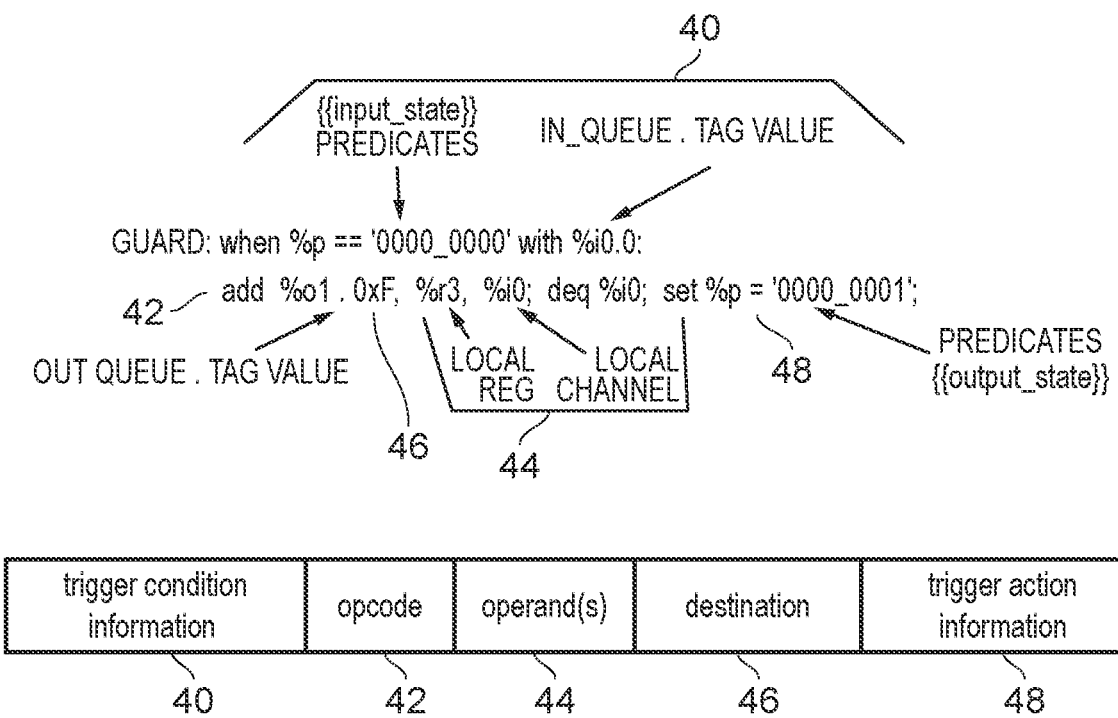
FIG. 2 illustrates an example of a triggered instruction.

FIG. 2 illustrates an example of a triggered instruction. The lower part of FIG. 2 illustrates an example of fields of an instruction encoding, while the upper part of FIG. 2 shows information specified (in high level code representation) for an example of a triggered instruction by a programmer/compiler. The triggered instruction specifies:

- trigger condition information 40 indicating one or more trigger conditions which are to be satisfied by machine state of the processing element for the instruction to be validly issued for execution.
- an opcode 42 identifying the type of processing operation to be performed in response to the instruction (e.g. add in the high-level code example of FIG. 2).
- one or more operands 44 for the processing operation;
- a destination location 46 to which the result of the processing operation is to be output; and
- trigger action information 48 indicating one or more updates to machine state of the processing element to be made in response to the execution of the triggered instruction.

It will be appreciated that while the fields of the instructions are shown in a particular order in FIG. 2, other implementations could order the fields differently. Also, information shown as a single field in the encoding of FIG. 2 could be split between two or more discontiguous sets of bits within the instruction encoding.

In this example, the trigger condition information includes predicate information and input channel availability information. The predicate information and input channel availability information could be encoded separately in the trigger condition information, or represented by a common encoding.

The predicate information specifies one or more events which are to occur for the instruction to be validly issued. Although other encodings of the predicate information are also possible (e.g. with each value of the predicate information representing a certain combination of events that are to occur, not necessarily with each event represented by a separate bit in the encoding), a relatively simple encoding can be for each bit of the predicate indication to correspond to a different event and indicate whether that event is required to have occurred for the instruction to be validly issued for execution. Hence, if multiple bits are set, the trigger conditions requires each of those events to occur for the instruction to be issued. An "event" represented by the predicate information could, for example, be any of:

- occurrence of a hardware-signalled event (e.g. a reset, an interrupt, a memory fault, or an error signal being asserted).
- a buffer full/empty event caused by one of the buffer structures described below becoming full or empty.
- a software-defined event which has no particular hardware-defined meaning. Software can use such predicate bits to impose ordering restrictions on instructions. For example, if a first instruction should not be executed until a second instruction has executed, the second instruction can specify (in its trigger action information 48) that a selected predicate bit should be set in response to the second instruction, and the first instruction can specify (in its trigger condition information 40) that the selected predicate bit should be set in order for the first instruction to validly be issued for execution.

The meaning of particular predicate bits may also depend on control state stored in a configuration register, which affects the interpretation of the predicate bits. For example, FIG. 2 shows an 8-bit predicate field which allows for 256 different combinations of events to be encoded (e.g., a combination of 8 different events in any independent combination of ON/OFF settings for each event if a bit per event is allocated, or 256 more arbitrary combinations of events if the encoding does not allocate a separate bit per event). The configuration register may store control which sets of events are represented by each encoding, selecting events from a larger set of events supported in hardware.

The trigger action information 48 can be defined using output predicates in a corresponding way to the input predicates defined for the trigger condition information 40.

A given triggered-instruction processing element (CT) may receive input data from a number of input channels, where each input channel may be a physical signal path receiving input data from a particular source. The source of the input data could be, for example, the memory tile MT associated with that CT or a MT shared between a cluster of CTs including the given CT, or could be the on-chip network linking with other sets of CTs, or could be a dedicated signal path (separate from the main network on chip between CTs) between a particular pair of CTs or cluster of CTs.

Hence, as shown in FIG. 2, the trigger condition information 40 could also include an input data availability condition which indicates that valid issue of the instruction also depends on availability of input data on a particular input data channel. For example, the high level instruction shown at the top of FIG. 2 indicates in its trigger conditions an identifier "% i0.0" signifying that valid issue requires availability of input data having a particular tag value "0" on a particular input channel (% i0). Of course, the indication "% i0.0" is just an example representation of this information at a high level and it will be appreciated that, in the instruction encoding itself, the trigger condition information 40 may encode in other ways the fact that triggering of the instruction depends on input data availability of data having a specified tag value on a specified input channel. It is not essential to always specify a particular tag value required to be seen in order for the trigger conditions to be satisfied. The triggered instruction architecture may also support the ability for the instruction to be triggered based on availability of input data (with any tag value) on a specified input channel.

The operands 44 for the triggered instruction can be specified in different ways. While FIG. 2 shows an instruction having two operands, other instructions may have fewer operands or a greater number of operands. An operand can be identified as being stored in a region of the register file of the triggered-instruction processing element (CT). The operand may be identified either as being within a particular data register stored within the register file or (as will be discussed in greater detail below) in a buffer-region of the register file. See for example the operand identified using the identifier "% r3" in FIG. 2, indicating that the operand is to be taken from register number 3. Also, an operand can be identified as being the data value taken from a particular input channel, such as input channel "% i0" as shown in FIG. 2. Again, while FIG. 2 shows the generic case where any data from input channel % i0 may be processed by the instruction, it may also be possible to specify that data having a particular tag value should be used as the operand (e.g. the operand could be specified as % i0.0x5, indicating that the operand is the data value having tag 0x5 on input channel % i0).

Similarly, the destination location 46 for the instruction could be any of a data register stored in the register file in the CT's local register address space, a buffer-region within the register file, or (as in the example of FIG. 2) an indication of an output data channel onto which the result of the instruction should be output. The output data channel may be a signal path passing data to the same CT or another CT, or to the CT's or other CT's MT, or to the network on chip. The destination location 46 can identify a tag value to be specified in the tagged data item 50 to be output on the output channel. For example, the instruction in FIG. 2 is specifying that a data value tagged with tag value 0xF should be output on output channel % o1.

Figure 3:
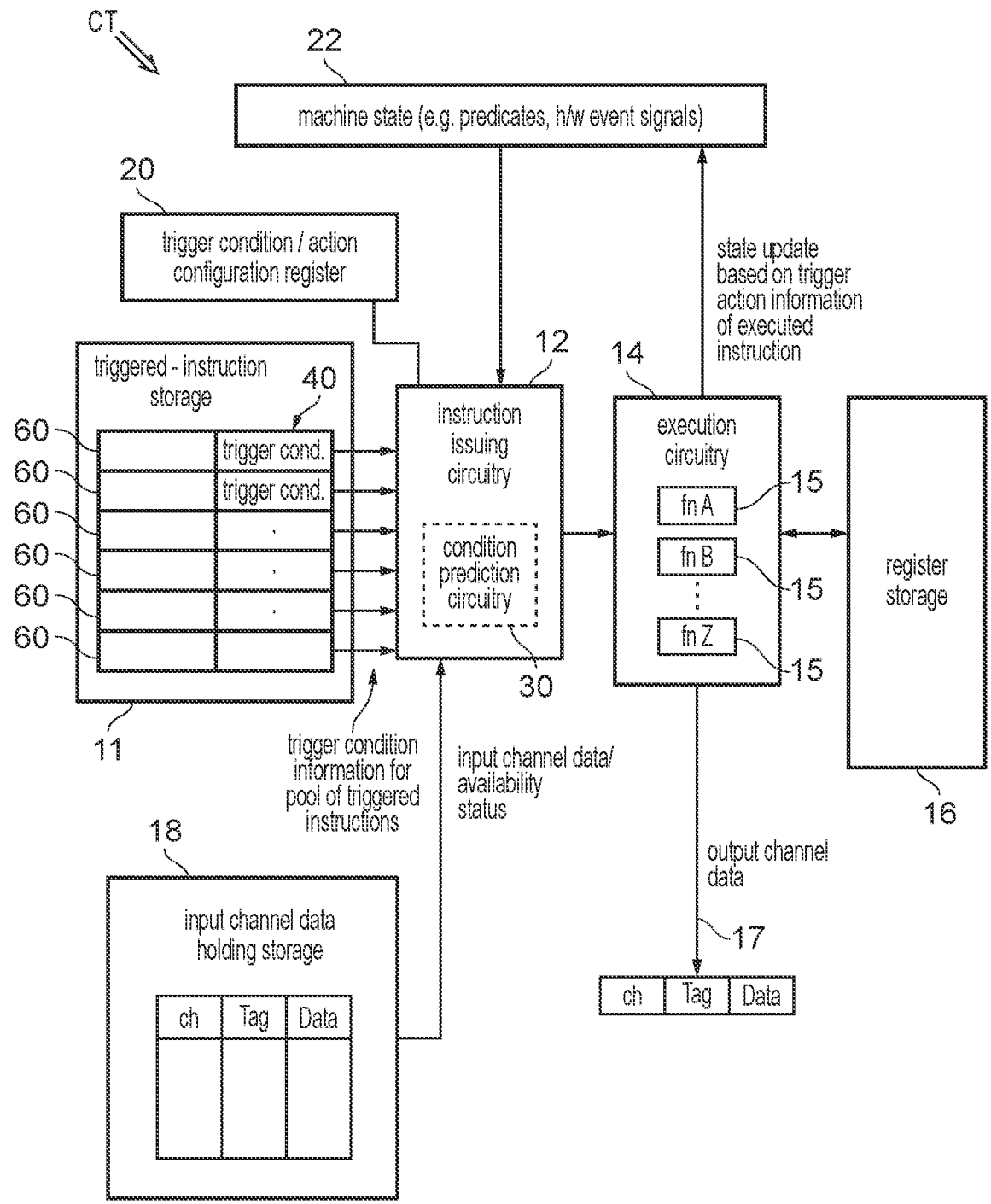
FIG. 3 illustrates an example of circuitry of a given triggered-instruction processing element.

FIG. 3 illustrates an example of circuitry included in a given triggered-instruction processing element (in particular, the CT of the processing element) for processing triggered instructions. Triggered-instruction storage circuitry 11 includes a number of storage locations 60 for storing respective triggered-instructions. The trigger condition information 40 of those instructions is made available to instruction issuing circuitry 12 which analyses whether the trigger conditions 40 for the pool of triggered instructions are determined to be satisfied by the machine state 22 (and, if applicable for a given instruction, also determines whether the trigger conditions are satisfied based on input channel data availability status of input channel data which has been received from input channels and is being held in input channel data holding storage 18). The machine state 22 used to evaluate trigger conditions may include hardware event signals indicating whether various hardware events have occurred, as well as predicate indications set based on trigger actions from previous triggered instructions as discussed earlier. Interpretation of the predicates may depend on configuration information stored in a trigger condition/action configuration register 20.

Some examples may support speculative issue of triggered instructions, in which case the instruction checking circuitry 12 includes condition prediction circuitry 30 for predicting whether the trigger conditions for a given triggered instruction will be satisfied. The prediction can be based on prediction state maintained based on outcomes of previous attempts at executing the instructions (e.g. the prediction state may correlate an earlier event or identification of an earlier instruction with an identification of a later set of one or more instructions expected to be executed some time after the earlier event or instruction). If the prediction is incorrect and an instruction is incorrectly issued despite its trigger conditions not turning out to be satisfied, then the effects of the instruction can be reversed (e.g. by flushing the pipeline and resuming processing from a previous correct point of execution).

If multiple ready-to-issue triggered instructions are available, which each are determined or predicted to have their trigger conditions satisfied in the same cycle of selecting a next instruction to issue, the instruction issuing circuitry 12 selects between the ready-to-issue triggered instructions based on a predefined priority order. For example, the priority order may be in a predetermined sequence of the storage locations 60 for the triggered-instruction storage circuitry 11 (with the instructions being allocated to those storage locations 60 in an order corresponding to the order in which the instructions appear in the memory address space from which those instructions are fetched—hence the programmer or compiler may influence the priority order by defining the order in which the instructions appear in memory). Alternatively, explicit priority indications may be assigned to each instruction to indicate their relative priority.

When a triggered instruction is selected for issue, it is sent to the execution circuitry 14 of the processing element (CT), which comprises a number of execution units 15 for executing instructions of different types of classes. For example, execution units 15 could include an adder to perform addition/subtraction operations, a multiplier to perform multiplication operations, etc. Operands for a given operation performed by the execution circuitry 14 can be derived either from input channel data from the input channel data holding storage 18, or from register data read from local register storage 16 of the processing element (or, as mentioned below from further register storage in an input processing block which is accessible based on a register address in the register address space used to access the local register storage 16). The result of a given operation performed by the execution circuitry can be output either as output channel data 17 to be output over a given output channel (to the same CT or other CTs, those CTs' associated MTs, or the network on chip) or could be written to a destination register of the local register storage 16 (or to the register storage in the input processing block). In addition to outputting the computational result of the executed instruction, the execution circuitry 14 also updates the machine state 22 based on any trigger action specified by the trigger action information 48 of the executed instruction (e.g. one or more predicate bits may be set or cleared as specified by the trigger action information 48).

Hence, since a triggered instruction specifies the conditions required for its own valid processing and can also perform a computation operation in addition to setting the predicates for controlling subsequent program flow, there is no need for dedicated branch instructions which only control program flow but do not carry out a corresponding computation operation. This helps to increase the compute density (amount of computational workloads achieved per instruction) and hence can improve performance.

Triggered spatial processing elements (PEs) typically have several input (and output) channels where packets of data are fed into it (and fed out of it). The input packets comprise tagged data values having a tag and data. The tag changes the system conditions, represented as predicate bits, and can therefore result in a specific instruction being triggered, based on the value of the tag. An advantage of the triggered instruction paradigm is how it reacts to incoming data streams efficiently, based on data availability.

However, a key constraint in triggered instruction architectures is the number of instructions that can be stored in the triggered-instruction storage 11 of each PE. The checking of trigger conditions for each triggered instruction in the pool of instructions stored in triggered-instruction storage 11 limits how many instructions can feasibly be stored in a given PE.

The technique discussed in this application enables data queued in a buffer structure to be dequeued/enqueued in response to instructions which also perform a computational processing operation, with management of head/tail pointers for the buffer structures done in hardware, to avoid the need for dedicated instructions (e.g. load/store instructions, and any instructions for updating head/tail pointers) to be used to manage the dequeue/enqueue operation. This improves the compute density of the pool of instructions stored in the triggered-instruction storage 11, increasing the amount of useful work done for a finite number of instructions. Hence, performance can be improved.

FIGS. 4a and 4b illustrate two different alternative sets of encodings for the issued instruction. FIG. 4a schematically illustrates the use of a first instruction encoding 70 specifying trigger condition information, an opcode, register operand(s), a destination register and trigger action information. FIG. 4a also schematically illustrates a second instruction encoding 72 specifying trigger condition information, an opcode which is the same opcode as used in the first instruction encoding 70, a set of operands that may comprise a combination of register(s) and or buffer region(s), one or more destination registers or destination buffer-regions, and trigger action information. The two encodings (first encoding 70 and second encoding 72) differ in that the input and output values specified in the first encoding 70 are all identified as referencing specific registers of the register file. On the other hand, the second encoding references at least one value (input or output) that is a buffer-region, by specifying a buffer dequeue/enqueue register instead of one of the other registers of the register file 16.

FIG. 4b schematically illustrates an alternative set of encodings for the issued instructions. In particular, FIG. 4b schematically illustrates the use of a first instruction encoding 74 specifying trigger condition information, a first opcode, register operand(s), one or more destination registers and trigger action information. FIG. 4b also schematically illustrates a second instruction encoding 76 specifying trigger condition information, a second opcode, register operand(s), one or more destination registers and trigger action information. The processing circuitry determines, based on the first opcode that the operand(s) and the destination will correspond to a data register in the register file and interprets these fields of the first instruction encoding 74 as specifying data registers. On the other hand, the processing circuitry determines, based on the second opcode that at least one of the operand(s) and the destination(s) may correspond to one or more buffer-regions.

Figure 5:
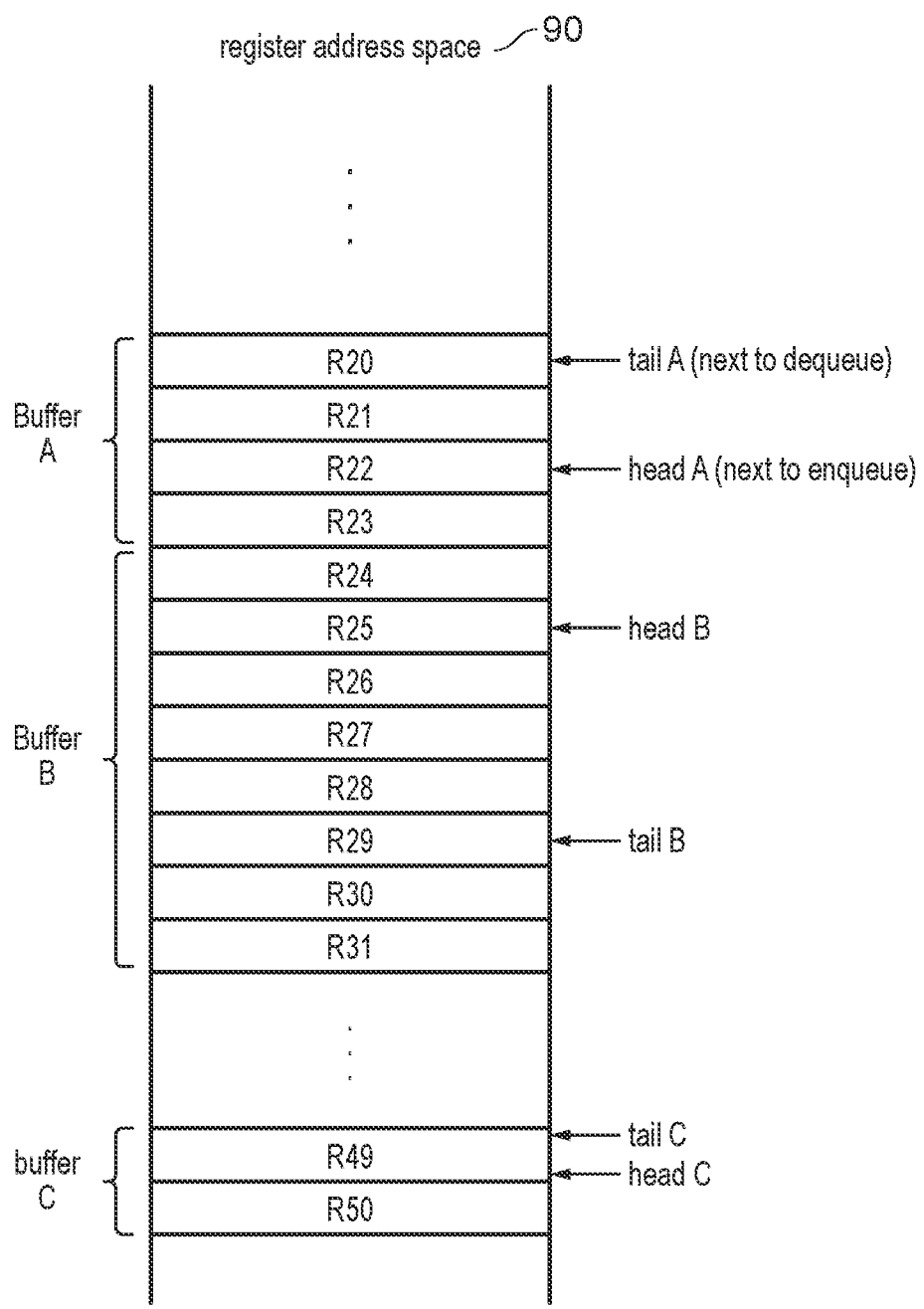
FIG. 5 illustrates an example of mapping buffer structures for processing input channel data onto register storage.
Figure 6:
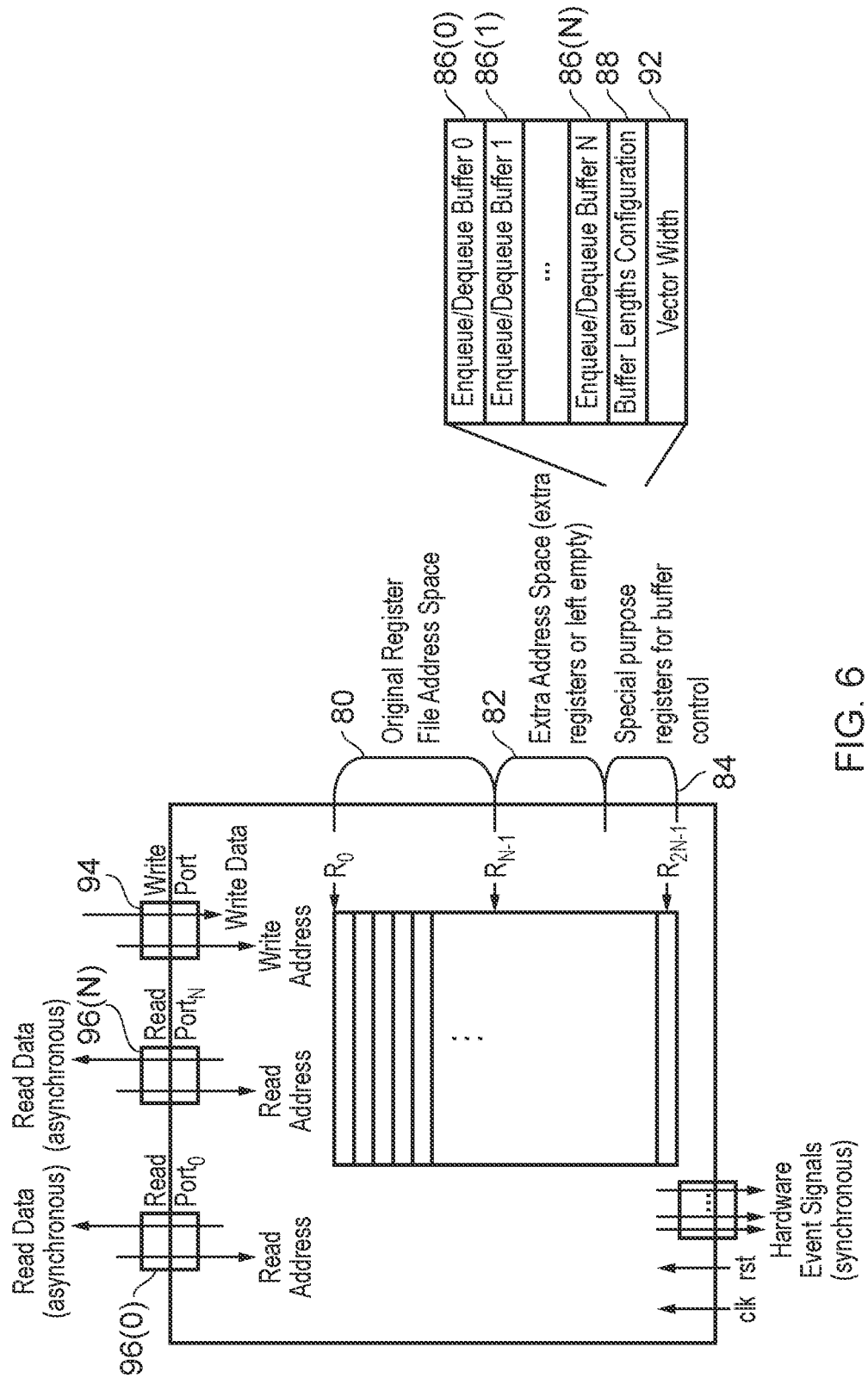
FIG. 6 illustrates an example of an extended register file for storing buffer configuration data.

The buffer-regions may be managed through the use of configuration data. As shown in FIG. 5, configuration data may be defined to specify start/end points (or one of the start/end points and a buffer size) for a number of buffers A, B, C, which can then be mapped to particular register address ranges within the general purpose register address space 9X) (e.g. in this instance, registers R20-R23 for buffer A, registers R24-R31 for buffer B and registers R49-R50 for buffer C). Whilst the buffer sizes can be hardwired into the processing circuitry, the buffer configuration data may also be stored in the register file (the register file can be expanded to include registers to store such buffer configuration data). FIG. 6 schematically illustrates the provision of a register file comprising registers that are addressable using an additional bit (doubling the size of the address space). The register file comprises an original register file address space 80 comprising registers $R_0$ to $R_{N-1}$, and additional register space 82, 84 comprising registers $R_N$ to $R_{2N-1}$. The additional register space is split between special purpose registers 84 for control of the buffer region and additional addressable register space 82 that can be utilised for additional register space. The special purpose registers 84 comprise a set of enqueue/dequeue buffer registers 86(0), 86(1), ..., 86(N). Reference to the enqueue/dequeue buffer registers 86(0), 86(1), ..., 86(N) triggers an enqueue/dequeue operation to be performed for the buffer referred to. For example, if special purpose register 86(1) is referenced, then an enqueue/dequeue operation will be triggered to enqueue data to and/or dequeue data from the buffer-region associated with special purpose register 86(1). The special purpose registers may also comprise information indicating the buffer lengths 88 and vector width configuration 92. The register file is provided with a number of read ports 96 and a write port 94. When an issued instruction references a data register in the register file as a location from which an input data item is to be read, the processing circuitry maps a read port 96 to the data register and the data item stored in that data register is mapped to a processing unit for use in a processing operation. Similarly, when an issued instruction references a data register in the register file as a location to which an output data item is to be written, the processing circuitry maps the write port 94 to the data register. On the other hand, if the issued instruction references one of the enqueue/dequeue registers 86 as an identifier of a buffer from which to dequeue data, the tail pointer (for example, stored in the enqueue/dequeue buffer register 86) is used to map the location identified by the tail pointer to the read port 96. Similarly, if the issued instruction references one of the enqueue/dequeue registers 86 as an identifier of a buffer to which output data is to be enqueued, the head pointer (for example, stored in the enqueue/dequeue buffer register 86) is used to map the write port 94 to the location identified by the head pointer.

Figure 7:
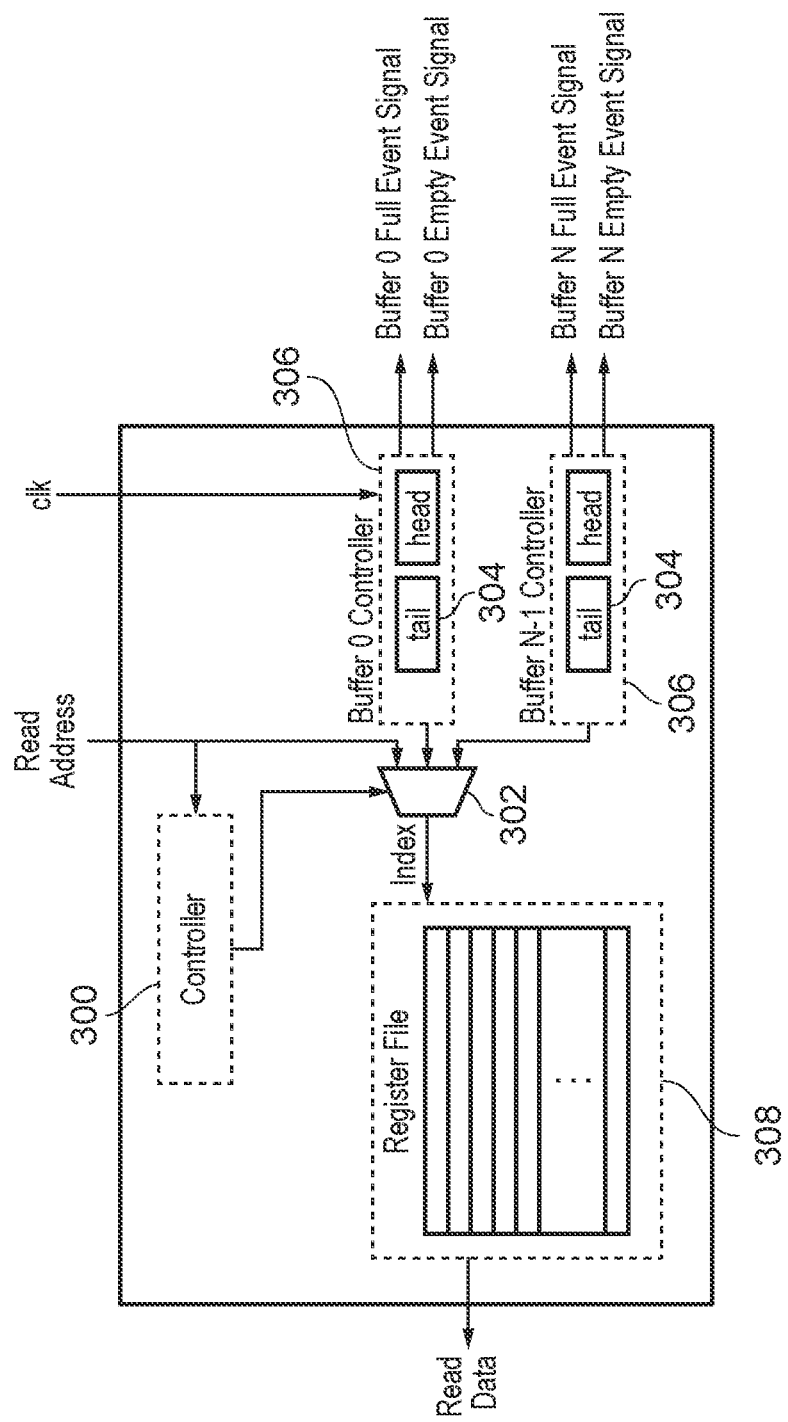
FIG. 7 illustrates an example a buffer empty condition.

FIG. 7 schematically illustrates the reading of data from a buffer-region of the register file. A read address is provided to the processing circuitry which is passed to a controller 300. The controller 300 determines whether or not the read address corresponds to a data register, or one of the buffer enqueue/dequeue registers 86. When the read address corresponds to a data register, the controller controls multiplexor 302 to pass at least an indexing portion of the read address to the register file 308 which outputs the read data located at that address. If the controller 300 identifies that the read address corresponds to one of the enqueue/dequeue registers 86, then the controller 300 controls the multiplexor 302 to use the tail pointer 304 that is comprised in the buffer control data 306 to index into the register file 308 which outputs a data item identified by the tail pointer 304 for the buffer region identified by the read address. In addition, the processing circuitry is configured to update the tail pointer 304 that is associated with the buffer region identified by the read address to point to the register storing a next data item to be dequeued from that buffer-region. The processing circuitry is also responsive to an indication that the buffer-region is empty, for example, because the tail pointer has "caught up" with the head pointer, to issue a buffer empty event signal. The buffer-empty event signal is part of the execution state of the system and can be used to trigger further instructions in the triggered architecture.

Figure 8:
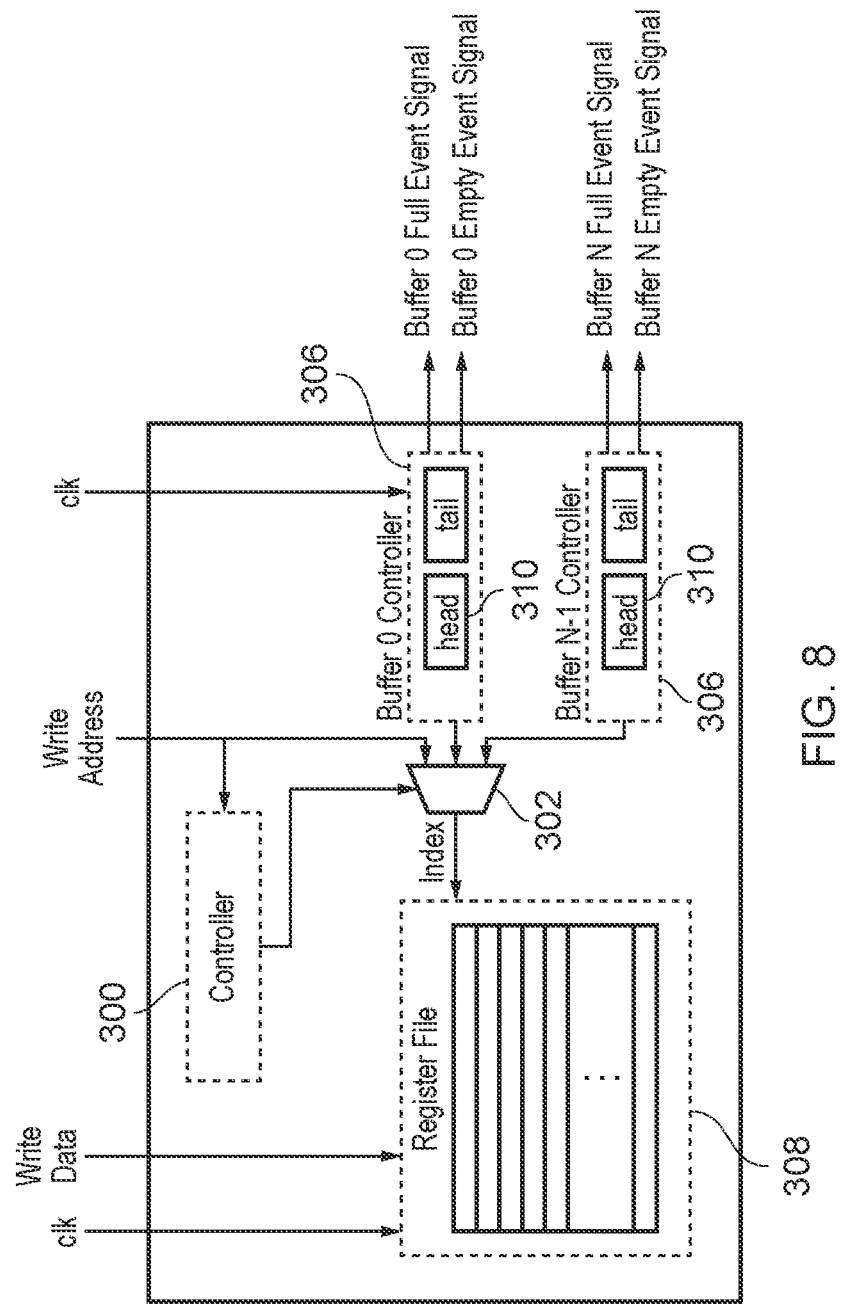
FIG. 8 illustrates an example of a buffer full condition.

FIG. 8 schematically illustrates the writing of data to a buffer-region of the register file. A % write address is provided to the processing circuitry which is passed to a controller 300. The controller 300 determines whether or not the write address corresponds to a data register, or one of the buffer enqueue/dequeue registers 86. When the write address corresponds to a data register, the controller controls multiplexor 302 to pass at least an indexing portion of the write address to the register file 308 which receives the write data and stores the write data at the address. If the controller 300 identifies that the write address corresponds to one of the enqueue/dequeue registers 86, then the controller 300 controls the multiplexor 302 to use the head pointer 310 that is comprised in the buffer control data 306 to determine the index of the register file 308 to which the write data is to be and to write the write data to that address. In addition, the processing circuitry is configured to update the head pointer 310 that is associated with the buffer region identified by the read address to point to a next data item to be dequeued from that buffer-region. The processing circuitry is also responsive to an indication that the buffer-region is full, for example, because the head pointer 310 has "caught up" with the tail pointer, to issue a buffer full event signal. The buffer full event signal is part of the execution state of the system and can be used to trigger further instructions in the triggered architecture.

Figure 9:
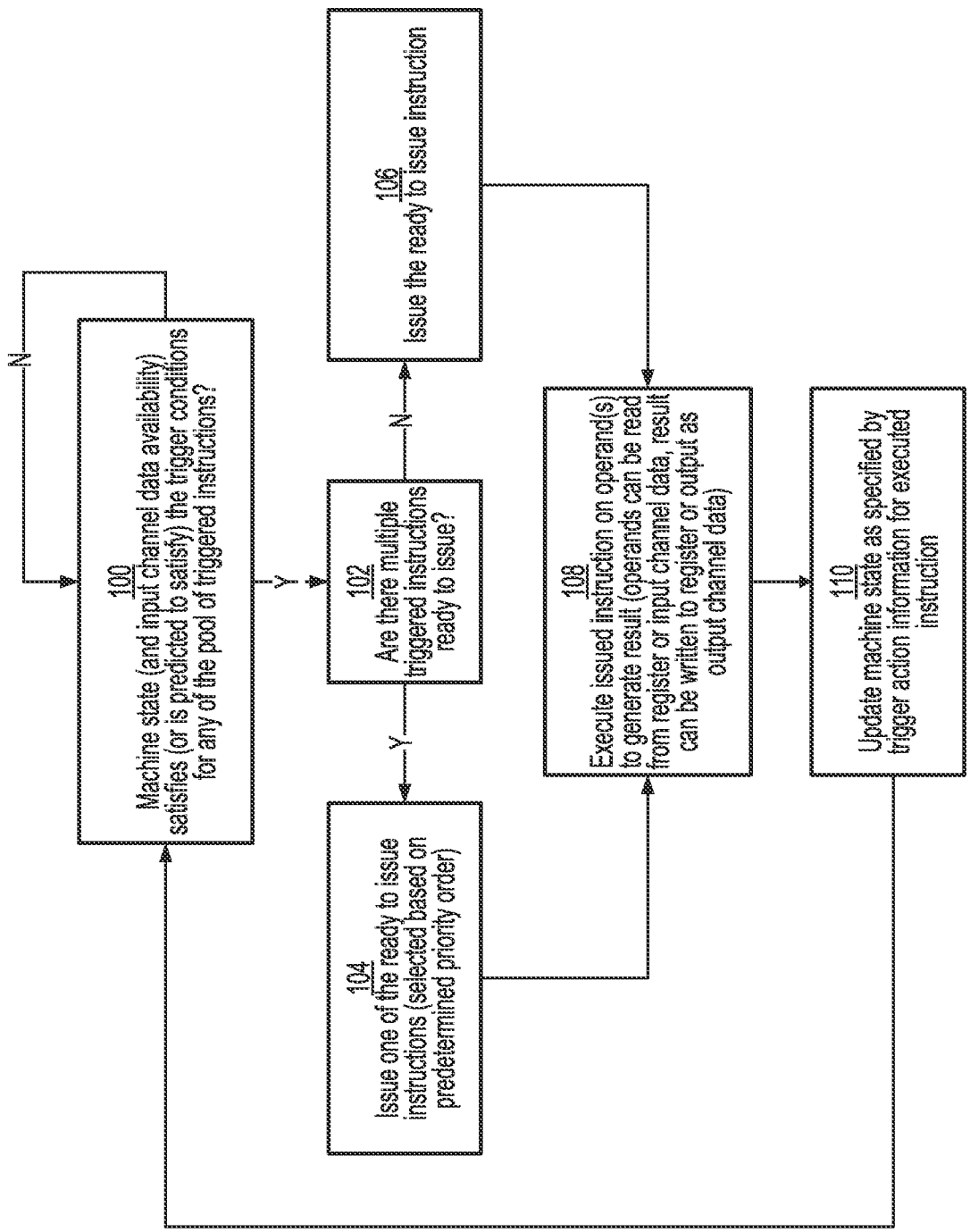
FIG. 9 is a flow diagram illustrating a method of processing instructions according to a triggered instruction architecture.

FIG. 9 is a flow diagram illustrating processing of triggered instructions on a triggered-instruction processing element. At step 100, the instruction issuing circuitry 12 of the processing element determines whether the machine state 22 (and input channel data availability, if relevant for any particular instruction) satisfies, or is predicted to satisfy, the trigger conditions for any of the pool of triggered instructions stored in the triggered-instruction storage circuitry 11. If not, then the instruction issuing circuitry 12 waits for a time w % ben an instruction is determined or predicted to satisfy its trigger conditions. If multiple triggered instructions are ready to issue (step 102), then at step 104 the issuing circuitry issues one of the ready to issue instructions which is selected based on a predetermined priority order (e.g. the storage order of the instructions in memory). Otherwise, if there is only one instruction ready to issue, that instruction is issued at step 106. At step 108 the execution circuitry 14 executes the issued instruction on one or more operands to generate a result value. The operands can be read from local registers 16 or from input channel data stored in the input channel data holding area 18, or can be dequeued data which is dequeued from one of the input data buffers managed by the input channel processing circuitry 70. The result value can be written to a local register 16, output as output channel data, or enqueued onto one of the buffers managed by the input channel processing circuitry 70. At step 110, the execution circuitry 16 also triggers an update to the machine state 22 based on the trigger action information 48 specified by the executed instruction.

Figure 10:
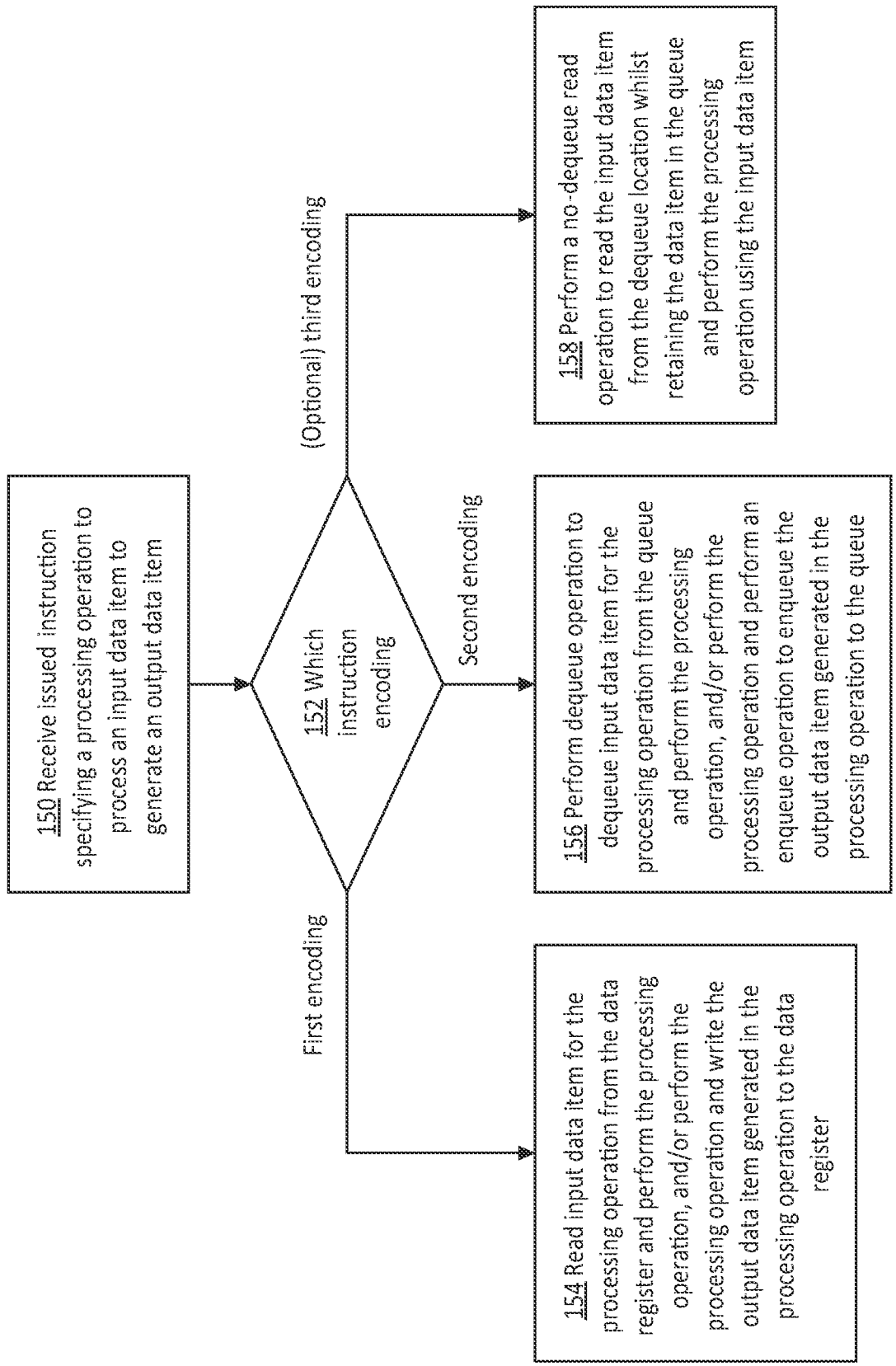
FIG. 10 is a flow diagram illustrating a method of processing an issued instruction.

FIG. 10 is a flow diagram describing the operation of the apparatus in response to different encodings of the issued instruction. Flow begins at step 150 where an issued instruction is received by frontend circuitry. The issued instruction specifies a processing operation that is to be performed by processing circuitry involving reading (or dequeuing) an input data item, and performing a processing operation on that input data item to generate an output data item. Flow then proceeds to step 152 where it is determined which instruction encoding has been used. If, at step 152, it is determined that the instruction encoding is the first instruction encoding then flow proceeds to step 154 where an input data item is read for the processing operation from a data register that is specified in the first encoding and the data processing operation is performed using the input data item. In addition, or as an alternative, at step 154, the data processing operation is performed on an input data item to generate the output data item that is written to the data register. If, at step 152, it was determined that the second encoding was used, then flow proceeds to step 156. At step 156, a dequeuing operation is performed to dequeue an input data item from a buffer-region specified in the instruction encoding and the processing operation is performed based on that input data item. In addition, or as an alternative, at step 156 the processing operation is performed and an output data item is generated that is enqueued to the buffer-region identified in the second encoding. The frontend circuitry may (optionally) be responsive to a third encoding corresponding to a no-dequeue read. If, at step 152, it is determined that the encoding is the third encoding then flow proceeds to step 158. At step 158, the processing circuitry performs a no-dequeue read operation to read the input data item from the dequeue location (for example, indicated by a tail pointer associated with the buffer region) whilst retaining the data item in the queue for a subsequent dequeue operation and the processing circuitry performs the processing operation using the input data item.

It will be appreciated that some variants of the instruction may perform both a register read/write (step 154) and a buffer dequeue/enqueue operation (step 156). For example, in the encoding of FIG. 4a, the same instruction could specify a data register for one operand (hence triggering the register read at step 154), a buffer to be dequeued for another operand (hence triggering the dequeue at step 156), and either a data register or a buffer to be enqueued for its destination (hence either triggering a register write as at step 154 or a buffer enqueue as at step 156). Hence, some instructions could, with respect to different operands or different ones of the input/output values, behave partially according to the first encoding and partially according to the second encoding.

Figure 11:
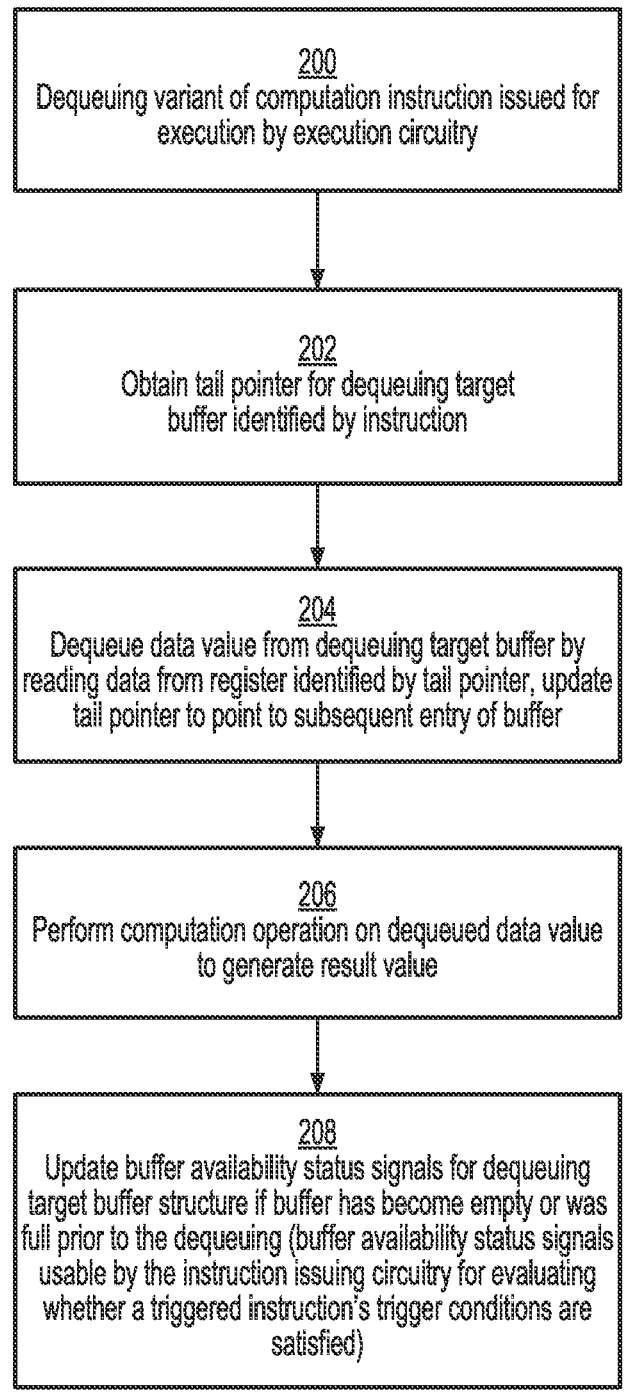
FIG. 11 is a flow diagram illustrating dequeuing an item from a target buffer structure.

FIG. 11 is a flow diagram illustrating processing of a dequeuing variant of a computation instruction (issued instruction) by the triggered-instruction processing element. At step 200, a dequeuing variant of the computation instruction is issued by the instruction issuing circuitry 12 for execution by the execution circuitry 16. The dequeuing variant specifies a dequeuing target buffer (e.g. by specifying the dequeuing register 76 for that buffer in one of its source register fields). At step 202, a tail pointer for the dequeuing target buffer is obtained, and at step 204, a data value is dequeued from the dequeuing target buffer, by reading data from a register (in register storage 74, 16) identified by the tail pointer. The tail pointer is updated to point to a subsequent entry of the buffer (wrapping around to the start of the buffer if the end of the buffer has been reached). At step 206, execution circuitry 16 performs the computation operation on the dequeued data value to generate a result value. Also, at step 208 buffer availability status signals for the dequeuing target buffer structure are updated, if the buffer has become empty or was full prior to dequeuing. Again, these buffer availability status signals can be used to trigger execution of instructions as discussed above.

Figure 12:
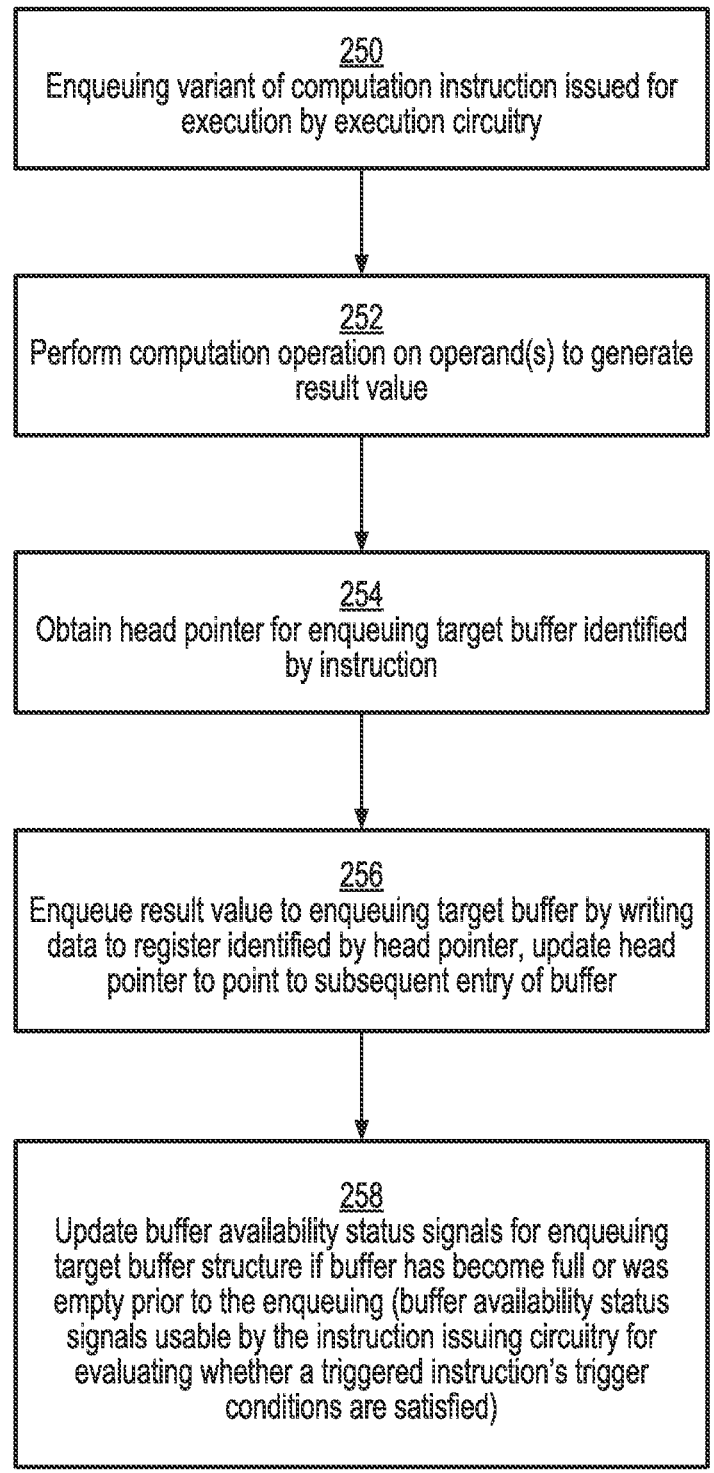
FIG. 12 is a flow diagram illustrating enqueuing an item on a target buffer structure.

FIG. 12 is a flow diagram illustrating processing of an enqueuing variant of a computation instruction by the triggered-instruction processing element. The instruction specifies an enqueuing target buffer (e.g. by specifying the dequeuing/enqueuing register 76 for that buffer in its destination register field). At step 250, the enqueuing variant of the computation instruction is issued by the instruction issuing circuitry 12 for execution by the execution circuitry 16. At step 252, the execution circuitry performs a computation operation on one or more operands to generate a result value. At step 254, the head pointer for the enqueuing target buffer identified by the instruction is obtained. At step 256, the result value of the computation is enqueued to the enqueuing target buffer by writing data to a register (in register storage 74 or 16) identified by the head pointer. The head pointer is updated to point to a subsequent entry of the buffer (again with a wraparound if necessary). At step 258, the buffer availability status signals for the enqueuing target buffer structure are updated if the buffer has become full or is no longer empty.

It will be appreciated that some competition instructions may act as both the dequeuing and enqueuing variants, in which case the operations shown in FIGS. 11 and 12 may be combined (but with a single instance of performing the computation operation—steps 206 and 252 would be the same step).

Figure 13:
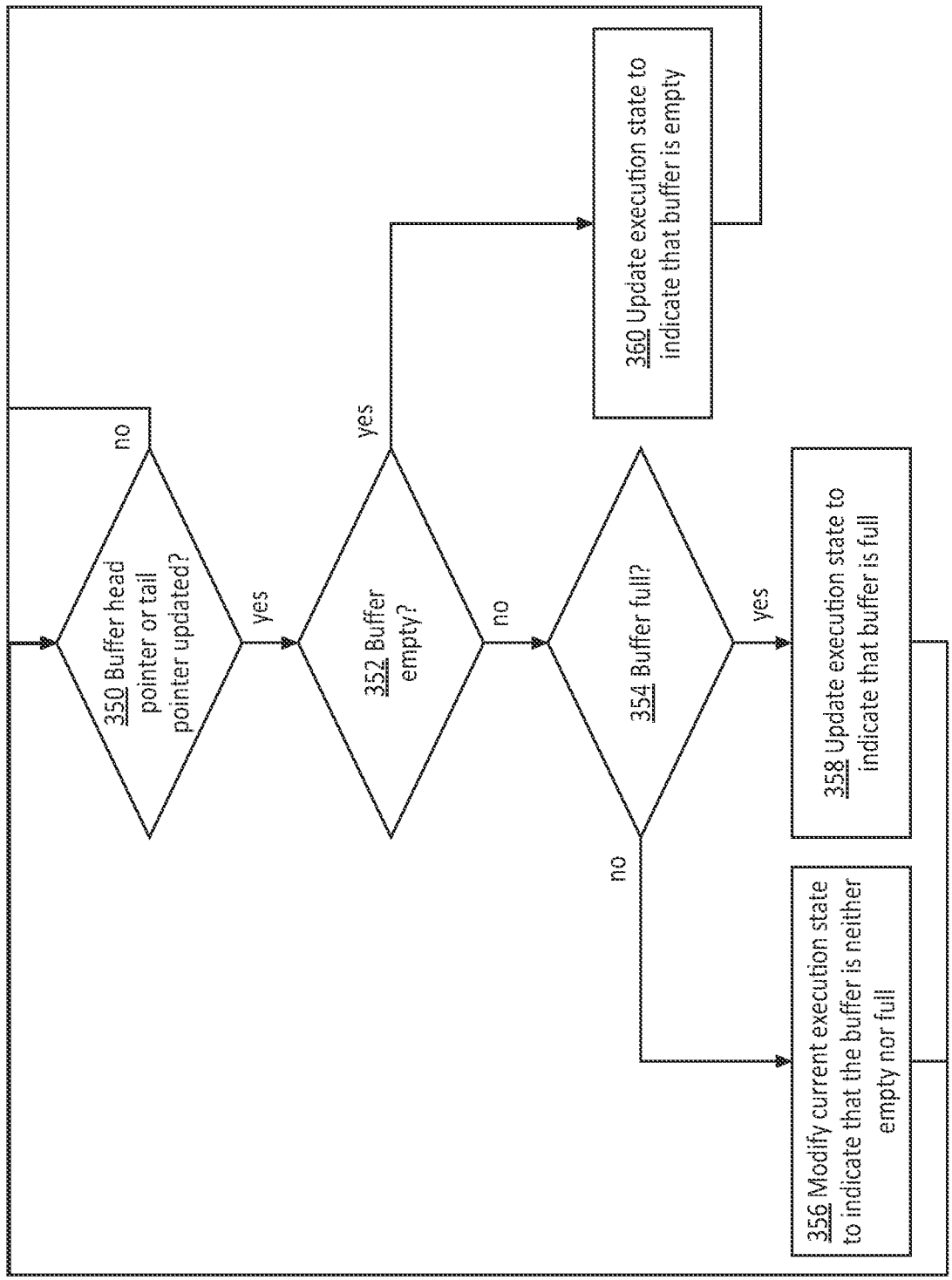
FIG. 13 is a flow diagram illustrating the updating of an execution state based on a state of a buffer.

FIG. 13 schematically illustrates the updating of the execution state based on a current state of a buffer-region. Flow begins at step 350 where it is determined if either of the head or tail pointers associated with the buffer region are being updated. If, at step 350 it is determined that neither the head nor the tail pointer are being updated then flow remains at step 350. If, at step 350, it is determined that one of the head or tail pointers is being updated then flow proceeds to step 352. At step 352 it is determined if the buffer is empty. It, at step 352, it is determined that the buffer is empty then flow proceeds to step 360 where the execution state is updated to indicate that the buffer is empty before flow returns to step 350. If, at step 352, it is determined that the buffer is not empty then flow proceeds to step 354 where it is determined if the buffer is full. If, at step 354, it is determined that the buffer is full, then flow proceeds to step 358 where the execution state is updated to indicate that the buffer is full before flow returns to step 350. If, at step 354, it was determined that the buffer is not full, then flow proceeds to step 356 where the current execution state is modified to indicate that the buffer is neither empty nor full before flow returns to step 350.

Figure 14:
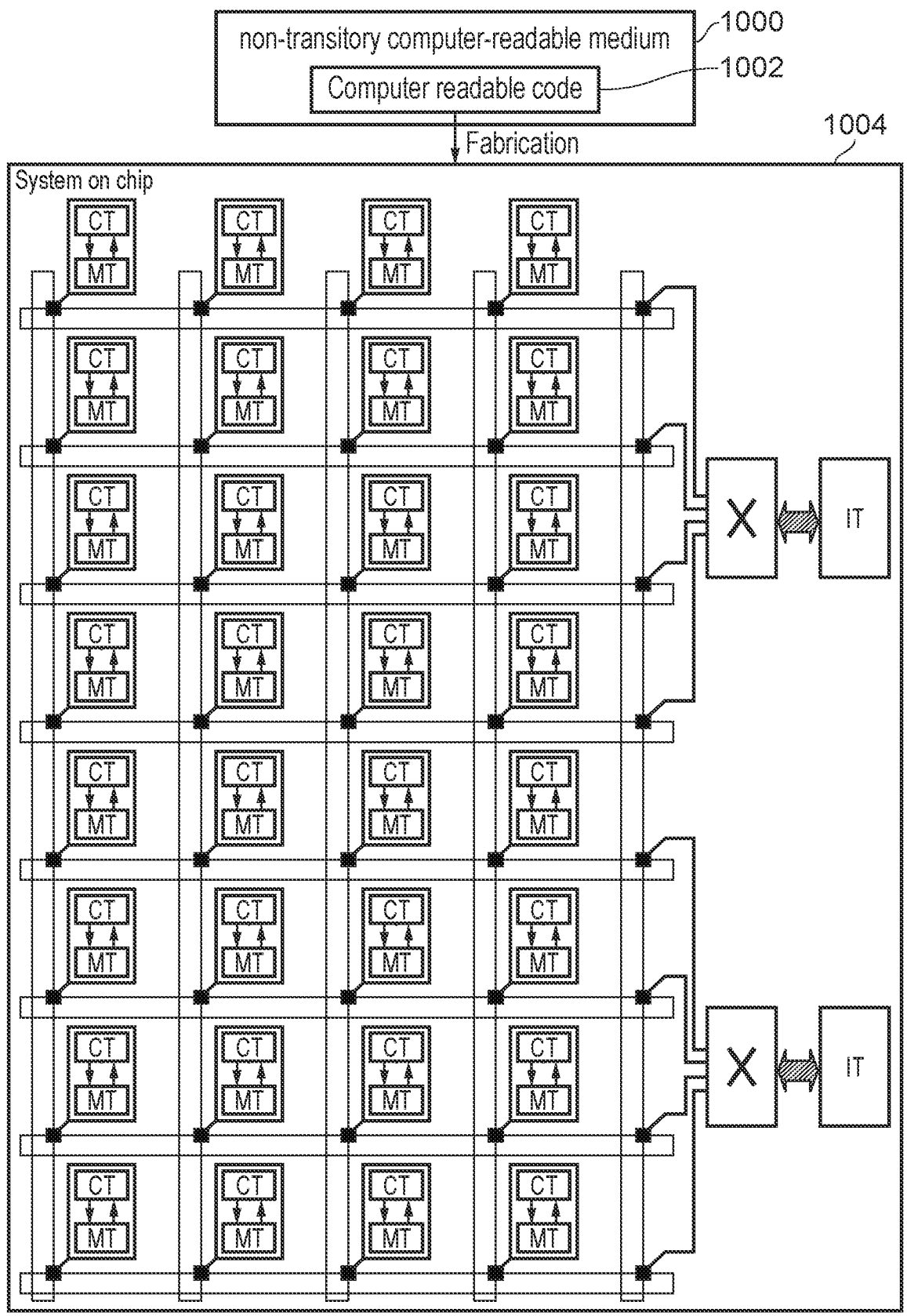
FIG. 14 illustrates fabrication of an apparatus.

FIG. 14 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. By way of example, the fabricated design 1004 may comprise the system on chip illustrated in FIG. 1. However, the fabricated design may correspond to any of the circuits described in FIGS. 3 and/or 6 to 8, configured to perform the steps described in relation to FIGS. 9 to 13.

In brief overall summary there is provided an apparatus, method and medium for data processing. The apparatus comprises a register file comprising a plurality of data registers, and frontend circuitry responsive to an issued instruction, to control processing circuitry to perform a processing operation to process an input data item to generate an output data item. The processing circuitry is responsive to a first encoding of the issued instruction specifying a data register, to read the input data item from the data register, and/or write the output data item to the data register. The processing circuitry is responsive to a second encoding of the issued instruction specifying a buffer-region of the register file for storing a queue of data items, to perform the processing operation and to perform a dequeue operation to dequeue the input data item from the queue, and/or perform an enqueue operation to enqueue the output data item to the queue.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B). A and B in combination (without C). A and C in combination (without B), B and C in combination (without A), or A. B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Configurations of the invention may also be described by the following numbered clauses:

Clause 1. An apparatus comprising:
　a register file comprising a plurality of data registers; and
　frontend circuitry responsive to an issued instruction, to control processing circuitry to perform a processing operation to process an input data item to generate an output data item,
　wherein:
　the processing circuitry is responsive to a first encoding of the issued instruction specifying a data register of the plurality of data registers, to at least one of:
　　read the input data item for the processing operation from the data register; and
　　write the output data item generated in the processing operation to the data register; and
　the processing circuitry is responsive to a second encoding of the issued instruction specifying a buffer-region of the register file for storing a queue of data items, to perform the processing operation and at least one of:
　　perform a dequeue operation to dequeue the input data item for the processing operation from the queue; and
　　perform an enqueue operation to enqueue the output data item generated in the processing operation to the queue.

Clause 2. The apparatus of clause 1, wherein the frontend circuitry is arranged to store a plurality of instructions and is configured to perform a comparison operation to compare an execution state of the processing circuitry to a plurality of trigger conditions each associated with an instruction of the plurality of instructions, and the frontend circuitry is responsive to the comparison indicating a match between one of the plurality of trigger conditions and the execution state to issue the instruction associated with that trigger condition as the issued instruction.

Clause 3. The apparatus of clause 2, wherein the control circuitry is configured to update the execution state based on a current state of at least one buffer meeting a predetermined condition.

Clause 4. The apparatus of clause 3, wherein the predetermined condition is at least one of a buffer full condition and a buffer empty condition.

Clause 5. The apparatus of any of clauses 2 to 4, wherein for at least one encoding of the trigger condition, the trigger condition is dependent on a current state of the at least one buffer.

Clause 6. The apparatus of any preceding clause, wherein:
the buffer-region is one of a plurality of buffer-regions each for storing a corresponding queue of data items;
the frontend circuitry is responsive to a further encoding of the issued instruction to control the processing circuitry to process the input data item and a further input data item to generate the output data item; and
the processing circuitry is responsive to the further encoding of the issued instruction to perform a further dequeue operation to dequeue the further input data item from the corresponding queue of a second buffer-region of the plurality of buffer-regions.

Clause 7. The apparatus of clause 6, wherein:
the buffer-region and the second buffer-region are a same buffer region; and
the dequeue operation and the further dequeue operation comprise dequeuing the input data item and the further input data item from the queue.

Clause 8. The apparatus of any preceding clause, wherein:
the second encoding of the issued instruction comprises an opcode and a register specifier field specifying one of a set of one or more buffer enqueue/dequeue registers; and
the first encoding of the issued instruction comprises the opcode and the register specifier field specifying the data register.

Clause 9. The apparatus of any of clauses 1 to 7, wherein the first encoding of the issued instruction and the second encoding of the issued instruction correspond to different opcodes.

Clause 10. The apparatus of any preceding clause, comprising configuration storage to store configuration data comprising a head pointer identifying an enqueue location in the register file from which to perform the enqueue operation and a tail pointer identifying a dequeue location in the register file from which to perform the dequeue operation.

Clause 11. The apparatus of clause 10, wherein the enqueue operation comprises writing the output data item to the enqueue location and updating the head pointer to indicate a next enqueue location in the register file and the dequeue operation comprises reading the input data item from the dequeue location and updating the tail pointer to indicate a next dequeue location in the register file.

Clause 12. The apparatus of any of clauses 10 and 11, wherein the processing circuitry is responsive to a third encoding of the issued instruction specifying the buffer-region of the register file to perform a no-dequeue read operation comprising reading the input data item from the dequeue location and retaining a current value of the tail pointer.

Clause 13. The apparatus of any of clauses 10 to 12, wherein the configuration data comprises information identifying the buffer-region.

Clause 14. The apparatus of any of clauses 10 to 13, wherein the configuration storage is comprised in the register file.

Clause 15. The apparatus of any of clauses 10 to 14, wherein the frontend circuitry is responsive to an update configuration instruction identifying new configuration data, to update the configuration data to the new configuration data.

Clause 16. The apparatus of any preceding clause, wherein the frontend circuitry is responsive to a buffer access instruction specifying an element of the buffer, to cause the processing circuitry to access a specified data item stored in the element of the buffer.

Clause 17. The apparatus of any preceding clause, wherein the buffer-region of the register file overlaps the plurality of data registers.

Clause 18. The apparatus of any preceding clause, wherein the buffer-region is a circular buffer region.

We claim:

1. An apparatus comprising:
a register file comprising a plurality of data registers; and
frontend circuitry responsive to an issued instruction, to control processing circuitry to perform a processing operation to process an input data item to generate an output data item,
wherein:
the processing circuitry is responsive to a first encoding of the issued instruction specifying a data register of the plurality of data registers, to at least one of:
read the input data item for the processing operation from the data register; and
write the output data item generated in the processing operation to the data register; and
the processing circuitry is responsive to a second encoding of the issued instruction specifying a buffer-region of the register file for storing a queue of data items, to perform the processing operation and at least one of:
perform a dequeue operation to dequeue the input data item for the processing operation from the queue; and
perform an enqueue operation to enqueue the output data item generated in the processing operation to the queue.

2. The apparatus of claim 1, wherein the frontend circuitry is arranged to store a plurality of instructions and is configured to perform a comparison operation to compare an execution state of the processing circuitry to a plurality of trigger conditions each associated with an instruction of the plurality of instructions, and the frontend circuitry is responsive to the comparison indicating a match between one of the plurality of trigger conditions and the execution state to issue the instruction associated with that trigger condition as the issued instruction.

3. The apparatus of claim 2, wherein the control circuitry is configured to update the execution state based on a current state of at least one buffer meeting a predetermined condition.

4. The apparatus of claim 3, wherein the predetermined condition is at least one of a buffer full condition and a buffer empty condition.

5. The apparatus of claim 2, wherein for at least one encoding of the trigger condition, the trigger condition is dependent on a current state of the at least one buffer.

6. The apparatus of claim 1, wherein:
the buffer-region is one of a plurality of buffer-regions each for storing a corresponding queue of data items;
the frontend circuitry is responsive to a further encoding of the issued instruction to control the processing circuitry to process the input data item and a further input data item to generate the output data item; and
the processing circuitry is responsive to the further encoding of the issued instruction to perform a further dequeue operation to dequeue the further input data item from the corresponding queue of a second buffer-region of the plurality of buffer-regions.

7. The apparatus of claim 6, wherein:
the buffer-region and the second buffer-region are a same buffer region; and the dequeue operation and the further dequeue operation comprise dequeuing the input data item and the further input data item from the queue.

8. The apparatus of claim 1, wherein:
the second encoding of the issued instruction comprises an opcode and a register specifier field specifying one of a set of one or more buffer enqueue/dequeue registers; and
the first encoding of the issued instruction comprises the opcode and the register specifier field specifying the data register.

9. The apparatus of claim 1, wherein the first encoding of the issued instruction and the second encoding of the issued instruction correspond to different opcodes.

10. The apparatus of claim 1, comprising configuration storage to store configuration data comprising a head pointer identifying an enqueue location in the register file from which to perform the enqueue operation and a tail pointer identifying a dequeue location in the register file from which to perform the dequeue operation.

11. The apparatus of claim 10, wherein the enqueue operation comprises writing the output data item to the enqueue location and updating the head pointer to indicate a next enqueue location in the register file and the dequeue operation comprises reading the input data item from the dequeue location and updating the tail pointer to indicate a next dequeue location in the register file.

12. The apparatus of claim 10, wherein the processing circuitry is responsive to a third encoding of the issued instruction specifying the buffer-region of the register file to perform a no-dequeue read operation comprising reading the input data item from the dequeue location and retaining a current value of the tail pointer.

13. The apparatus of claim 10, wherein the configuration data comprises information identifying the buffer-region.

14. The apparatus of claim 10, wherein the configuration storage is comprised in the register file.

15. The apparatus of claim 10, wherein the frontend circuitry is responsive to an update configuration instruction identifying new configuration data, to update the configuration data to the new configuration data.

16. The apparatus of claim 1, wherein the frontend circuitry is responsive to a buffer access instruction specifying an element of the buffer, to cause the processing circuitry to access a specified data item stored in the element of the buffer.

17. The apparatus of claim 1, wherein the buffer-region of the register file overlaps the plurality of data registers.

18. The apparatus of claim 1, wherein the buffer-region is a circular buffer region.

19. A method of operating an apparatus comprising a register file comprising a plurality of data registers, the method comprising:

controlling, in response to an issued instruction, processing circuitry to perform a processing operation to process an input data item to generate an output data item,
wherein
in response to a first encoding of the issued instruction specifying a data register of the plurality of data registers, the controlling comprises at least one of:
reading the input data item for the processing operation from the data register; and
writing the output data item generated in the processing operation to the data register; and
in response to a second encoding of the issued instruction specifying a buffer-region of the register file for storing a queue of data items, the controlling comprises controlling the processing circuitry to perform the processing operation and at least one of:
performing a dequeue operation to dequeue the input data item for the processing operation from the queue; and
performing an enqueue operation to enqueue the output data item generated in the processing operation to the queue.

20. A non-transitory computer-readable medium to store computer-readable code for fabrication of an apparatus comprising:
a register file comprising a plurality of data registers; and
frontend circuitry responsive to an issued instruction, to control processing circuitry to perform a processing operation to process an input data item to generate an output data item,
wherein:
the processing circuitry is responsive to a first encoding of the issued instruction specifying a data register of the plurality of data registers, to at least one of:
read the input data item for the processing operation from the data register; and
write the output data item generated in the processing operation to the data register; and
the processing circuitry is responsive to a second encoding of the issued instruction specifying a buffer-region of the register file for storing a queue of data items, to perform the processing operation and at least one of:
perform a dequeue operation to dequeue the input data item for the processing operation from the queue; and
perform an enqueue operation to enqueue the output data item generated in the processing operation to the queue.

* * * * *